(12) United States Patent
Igarashi

(10) Patent No.: US 7,127,119 B2
(45) Date of Patent: Oct. 24, 2006

(54) IMAGE PROCESSING APPARATUS AND METHOD, PROGRAM, AND STORAGE MEDIUM

(75) Inventor: Susumu Igarashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 804 days.

(21) Appl. No.: 10/263,822

(22) Filed: Oct. 4, 2002

(65) Prior Publication Data

US 2003/0067976 A1 Apr. 10, 2003

(30) Foreign Application Priority Data

| Oct. 5, 2001 | (JP) | ............................. 2001-310049 |
| Dec. 25, 2001 | (JP) | ............................. 2001-392637 |
| Jul. 4, 2002 | (JP) | ............................. 2002-195788 |

(51) Int. Cl.
*G06K 9/36* (2006.01)

(52) U.S. Cl. ........................ 382/250; 382/248; 382/251

(58) Field of Classification Search ................ 382/234, 382/235, 246, 253, 247, 245, 248, 250, 241, 382/239; 341/65, 67; 348/208.4; 375/240.12; 708/401, 409; 386/68
See application file for complete search history.

(56) References Cited

U.S. PATENT DOCUMENTS 5,848,194 A   12/1998  Ishizuka et al. ............ 382/234
6,031,959 A * 2/2000  Hamai et al. ................. 386/68
6,351,570 B1* 2/2002  Kobayashi ................... 382/250
6,664,902 B1* 12/2003 Andrew et al. ............... 341/50
6,819,803 B1* 11/2004 Mitchell et al. ............. 382/245
6,915,014 B1* 7/2005  Honma et al. .............. 382/239

FOREIGN PATENT DOCUMENTS

JP  02001078190 A  *  3/2001

OTHER PUBLICATIONS de Queiroz, "Processing JPEG-Compressed Images and Documents", IEEE vol. 7, No. 12, Dec. 1998, pp. 1661-1672.*

* cited by examiner

*Primary Examiner*—Anh Hong Do
(74) *Attorney, Agent, or Firm*—Fitzpatrick, Cella, Harper & Scinto

(57) ABSTRACT

An apparatus has a one-dimensional DCT transformer for applying the one-dimensional orthogonal transforms to n inputs and outputting n coefficients, a transposition converter for transposing n×n coefficients output from the one-dimensional DCT transformer and outputting every n outputs, and a multiplexer for selecting one output of the n outputs from the transposition converter or one output of the n outputs from the one-dimensional DCT transformer. The apparatus further includes a selector for selecting data as a combination of one output selected by the multiplexer and remaining (n−1) outputs, which are not input to the multiplexer, of the n outputs from the transposition converter, or the input image data, and supplying the selected data as n data to the one-dimensional DCT transformer.

23 Claims, 21 Drawing Sheets

FIG. 3A

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 3B

| h0 | 0, 1, 2, 3, 4, 5, 6, 7 |
|---|---|
| h1 | 8, 9, 10, 11, 12, 13, 14, 15 |
| h2 | 16, 17, 18, 19, 20, 21, 22, 23 |
| h3 | 24, 25, 26, 27, 28, 29, 30, 31 |
| h4 | 32, 33, 34, 35, 36, 37, 38, 39 |
| h5 | 40, 41, 42, 43, 44, 45, 46, 47 |
| h6 | 48, 49, 50, 51, 52, 53, 54, 55 |
| h7 | 56, 57, 58, 59, 60, 61, 62, 63 |

FIG. 3C

| v0 | 0, 8, 16, 24, 32, 40, 48, 56 |
|---|---|
| v1 | 1, 9, 17, 25, 33, 41, 49, 57 |
| v2 | 2, 10, 18, 26, 34, 42, 50, 58 |
| v3 | 3, 11, 19, 27, 35, 43, 51, 59 |
| v4 | 4, 12, 20, 28, 36, 44, 52, 60 |
| v5 | 5, 13, 21, 29, 37, 45, 53, 61 |
| v6 | 6, 14, 22, 30, 38, 46, 54, 62 |
| v7 | 7, 15, 23, 31, 39, 47, 55, 63 |

F I G. 4A
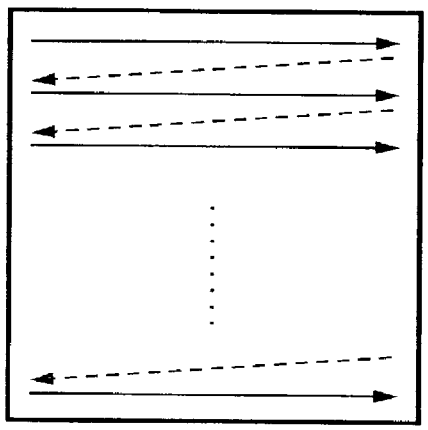
F I G. 4B
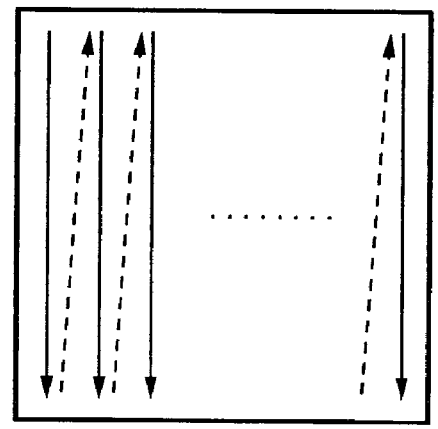

FIG. 13

| 1 | 2 | 6 | 7 | 15 | 16 | 28 | 29 |
|---|---|---|---|----|----|----|----|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 14

| S | S | S | S | 0 | S | 0 | 0 |
|---|---|---|---|---|---|---|---|
| S | S | S | S | 0 | S | 0 | 0 |
| S | S | S | 0 | S | 0 | 0 | 0 |
| S | 0 | S | S | 0 | 0 | 0 | 0 |
| 0 | 0 | 0 | 0 | 0 | 0 | 0 | 0 |
| 0 | 0 | 0 | 0 | 0 | S | 0 | 0 |
| 0 | 0 | S | 0 | 0 | 0 | 0 | 0 |
| 0 | 0 | 0 | 0 | 0 | 0 | 0 | 0 |

| QUANTIZATION THRESHOLD VALUE | MAXIMUM VALUE OF QUANTIZED DATA WHOSE PRODUCT DOES NOT EXCEED 1024 | QUANTIZATION THRESHOLD VALUE (BITS) × QUANTIZED DATA (BITS) | MEANS USED IN DEQUANTIZATION |
|---|---|---|---|
| 1 | 1024 | 1bit × 11bit | AS IT IS |
| 2 | 512 | 2bit × 10bit | COEFFICIENT UNIT |
| 3 | 341 | 2bit × 9bit | COEFFICIENT UNIT & ADDER |
| 4 | 256 | 3bit × 9bit | COEFFICIENT UNIT |
| 5 | 204 | 5bit × 8bit | |
| 6 | 170 | | |
| 7 | 146 | | |
| 8 | 128 | | |
| 9 | 113 | | |
| 10 | 102 | | |
| 11 | 93 | | |
| 12 | 85 | | |
| 13 | 78 | | |
| 14 | 73 | | |
| 15 | 68 | | |
| 16 | 64 | | |
| 17 | 60 | 7bit × 6bit | 6BITS × 8BITS MULTIPLIER |
| 18 | 56 | | |
| 19 | 53 | | |
| 20 | 51 | | |
| 21 | 48 | | |
| 22 | 46 | | |
| 23 | 44 | | |
| 24 | 42 | | |
| 25 | 40 | | |
| 26 | 39 | | |
| 27 | 37 | | |
| 28 | 36 | | |
| 29 | 35 | | |
| 30 | 34 | | |
| 31 | 33 | | |
| 32 | 32 | | |
| 33 | 31 | | |
| 34 | 30 | | |
| 35 | 29 | | |
| 36 | 28 | | |
| 37 | 27 | | |
| 38~39 | 26 | | |
| 40 | 25 | | |
| 41~42 | 24 | | |
| 43~44 | 23 | | |
| 45~46 | 22 | | |
| 47~48 | 21 | | |
| 49~51 | 20 | | |
| 52~53 | 19 | | |
| 54~56 | 18 | | |
| 57~60 | 17 | | |
| 61~64 | 16 | | |
| 65~68 | 15 | 8bit × 4bit | |
| 69~73 | 14 | | |
| 74~78 | 13 | | |
| 79~85 | 12 | | |
| 86~93 | 11 | | |
| 94~102 | 10 | | |
| 103~113 | 9 | | |
| 114~128 | 8 | | |
| 129~146 | 7 | | |
| 147~170 | 6 | | |
| 171~204 | 5 | | |
| 205~255 | 4 | | |

IMAGE PROCESSING APPARATUS AND METHOD, PROGRAM, AND STORAGE MEDIUM

FIELD OF THE INVENTION

The present invention relates to an image processing method and apparatus for applying the two-dimensional orthogonal transforms to image data which is segmented into n×n rectangular blocks, and also relates to a method and apparatus for quantizing/dequantizing.

BACKGROUND OF THE INVENTION

As a conventional compression technique of a multi-valued image, a method of segmenting an original image into blocks each consisting of a plurality of pixels, applying the two-dimensional (2D) DCTs, quantizing each coefficient by a designated quantization threshold value, and Huffman-encoding the quantization results is available.

As hardware implementation of 2D DCT transformation in such encoding process, the following proposal has been made. That is, the one-dimensional DCTs of image inputs, which are segmented into n×n rectangular blocks are computed to obtain n×n coefficients, the coefficients are written in a storage means having a capacity capable of storing the n×n coefficients, the written coefficients are read out after transposition conversion, and the one-dimensional DCTs of the readout coefficients are computed again, thereby consequently implement a 2D DCT transformation process.

FIG. 5 is a block diagram showing an example of the arrangement of such conventional 2D DCT transformation device.

Reference numeral 5001 denotes signal lines, which include n signal lines used to transfer n inputs input from an image supply system (not shown), and are connected to a selector 500. The selector 500 selects n inputs sent via the signal lines 5001 or n inputs sent via n signal lines 5004 in accordance with a control signal input via a select signal line 5005, and outputs the selected n inputs onto n signal lines 5002. The n signal lines 5002 are connected from the selector 500 to a one-dimensional DCT transformer 501. The one-dimensional DCT transformer 501 applies the one-dimensional DCTs to the n inputs, which are input via the signal lines 5002. The one-dimensional DCT transformer 501 outputs n one-dimensional DCT coefficients onto signal lines 5003 including n signal lines.

The signal lines 5003 are branched into two systems, one of which is connected to an encoder (quantizer; not shown), and the other of which is connected to a transposition converter 502. The transposition converter 502 has a block memory having a capacity capable of storing n×n coefficients input via the signal lines 5003, writes the n×n DCT coefficients input via the signal lines 5003 in that block memory, transposes and reads out them, and outputs every n coefficients onto signal lines 5004 in accordance with a clock signal (5007) and control signal (5008).

The operation of the overall conventional 2D DCT transformation device will be explained below using FIG. 5, and the timing charts shown in FIGS. 6A and 6B.

In this example, n=8. For the sake of simplicity, FIG. 3A shows the positions of 64 blocks obtained by segmenting data into 8×8 rectangular blocks, and numbers corresponding to the positions.

FIG. 4A shows the horizontal raster scan order, and FIG. 4B shows the vertical raster scan order, which orders are used in the following description.

First eight data are input via the signal lines 5001 at the head of a period 601 in the timing chart shown in FIG. 6A. These first eight data are represented by "h0" in FIG. 6A, and correspondence between this "h0" and the position numbers in the 8×8 rectangular blocks shown in FIG. 3A is as shown in FIG. 3B. As shown in FIG. 3B, each of "h0" to "h7" consists of eight data selected in the horizontal raster scan order. In the period 601, the control signal (5005) input to the selector 500 indicates "1". In this example, when the control signal (5005) input to the selector 500 is "0", the selector selects the signal lines 5004; when it is "1", the selector 500 selects the signal lines 5001. Hence, data on the signal lines 5001, i.e., "h0", are output onto the signal line 5002 in the period 601.

Likewise, data "h1" to "h7" are input to the selector 500 via the signal lines 5001 at the heads of respective periods 602 to 607, and are output onto the signal lines 5002 since the control signal (5005) is "1". The control signal (5005) input to the selector 500 indicates "1" during the periods 601 to 608. Hence, the selector 500 selects the values on the signal lines 5001 and outputs them onto the signal lines 5002.

The data "h0" output from the selector 500 in the period 601 are input to the one-dimensional DCT transformer 501 via the signal lines 5002. In this example, assume that the one-dimensional DCT transformer 501 outputs transformed coefficients in synchronism with the leading edge of the clock signal (5007) when the value of a control signal (5006) is "1".

As shown in FIG. 6A, the value of the control signal (5006) changes to "1" at the end of each of the periods 601 to 608 and periods 609 to 619. Therefore, the data "h0" input to the one-dimensional DCT transformer 501 undergoes one-dimensional DCT transformation in the period 601, and transformed coefficients are output onto the signal lines 5003 at the head of the period 602 in accordance with the control signal (5006) and clock signal (5007).

Likewise, the data "h1" to "h7" input to the one-dimensional DCT transformer 501 at the heads of the respective periods 602 to 608 undergo one-dimensional DCT transformation, and corresponding coefficients are output onto the signal lines 5003 at the heads of the respective periods 603 to 609.

The data "h0" to "h7" output from the one-dimensional DCT transformer 501 onto the signal lines 5003 at the heads of the respective periods 602 to 609 are input to the transposition converter 502 so as to undergo transposition, and are sequentially written in the internal block memory having the capacity capable of storing 64 data. Assume that this internal undergoes write or read access in synchronism with the clock signal (5007). The transposition converter 502 outputs data in synchronism with the leading edge of the clock signal (5007) when the value of the control signal (5008) is "1".

In this manner, after all the data "h0" to "h7" are written in the internal block memory of the transposition converter 502, they are read out in the vertical raster scan order, and every eight data are output in accordance with the control signal (5008) and clock signal (5007). The eight data output in this way are represented by each of "v0" to "v7" in FIG. 6A. Correspondence between these "v0" to "v7" and the position numbers in the 8×8 rectangular blocks shown in FIG. 3A is as shown in FIG. 3C. As shown in FIG. 3C, each of "v0" to "v7" consists of eight data selected in the vertical raster scan order.

The control signal (5008) changes to "1" at the end of the periods 609 to 616, as shown in FIG. 6A. Therefore, the data "v0" to v7" are sequentially output onto the signal lines 5004 at the head of the periods 610 to 617, and are sent to the selector 500.

Note that correspondence between eight data, which are contained in "h7" input from the one-dimensional DCT transformer 501 to the transposition converter 502 via the signal lines 5003 at the head of the period 609, and the position numbers in the 8×8 rectangular blocks shown in FIG. 3A is "56, 57, 58, 59, 60, 61, 62, 63", as shown in FIG. 3C.

On the other hand, correspondence between eight data, which are contained in "v0" input from the transposition converter 502 to the selector 500 via the signal lines 5004 at the head of the period 610, and the position numbers in the 8×8 rectangular blocks shown in FIG. 3A is "0, 8, 16, 24, 32, 40, 48, 56", as shown in FIG. 3C. That is, position number "56" in the 8×8 rectangular blocks shown in FIG. 3A appear in both data which form "h7" and "v0". In order to input data with position number "56" as an element of "h7", which is output from the one-dimensional DCT transformer 501 at the head of the period 609, to a RAM, and read it out in an identical clock cycle, that RAM must have some functions as a condition. The condition includes that a readout value corresponding to a given address is output within an identical clock cycle in response to an address input, i.e., the RAM is an asynchronous RAM, and the RAM can write data at a given address and can read out the written data within an identical clock cycle. However, the clock frequencies in recent LSIs are increasing, and use of an asynchronous RAM in such system is disadvantageous. Hence, it is a common practice to use a synchronous RAM. A RAM that can read out the written value within an identical clock cycle is special, and not all RAMs have this function. Especially, in order to configure a circuit that can be implemented on various processes, such special RAM should not be used. Therefore, a general synchronous RAM must be assumed as a RAM to be used. This means that input of "h7" to the transposition converter 502 and output of "v0" from the transposition converter 502 cannot be done within an identical clock cycle unless a RAM that satisfies the aforementioned condition is used.

For this reason, output of "v0" from the transposition converter 502 must be delayed one clock cycle from input of "h7" to the transposition converter 502. FIG. 6B shows detailed operations during the periods 608 to 610.

FIG. 6B shows the clock signal (5007), which is not shown in FIG. 6A.

In FIG. 6B, the data "v0" to "v7" that have undergone transposition conversion are input to the selector 500 via the signal lines 5004. The control signal (5005) is switched to "0" to select the signal lines 5004 at the head of the period 610 so as to execute the second one-dimensional DCT transformation. Therefore, the data "v0" to "v7" are sequentially output from the selector 500 onto the signal lines 5002 and are input to the one-dimensional DCT transformer 501 at the heads of the respective periods 610 to 617.

The data "v0" to "v7" input to the one-dimensional DCT transformer 501 undergo second one-dimensional DCT transformation by the one-dimensional DCT transformer 501, and are sequentially output onto the signal lines 5003 at the heads of the respective periods 611 to 618 in accordance with the control signal (5006). The data which are sequentially output at the heads of the respective periods 611 to 618 have undergone the two one-dimensional DCT transformation processes via transposition conversion, and are consequently equivalent to the 2D DCT transformation result.

Subsequently, the control signal (5005) is switched to "1" at the head of the period 618 so as to select the signal lines 5001 and to receive the next 8×8 rectangular block data. First eight data "h0" of the next 8×8 rectangular blocks are input from the image supply system (not shown) to the selector 500 via the signal lines 5001 at the head of the period 618. After that, DCT transformation is similarly done every 8×8 rectangular blocks.

Conventionally, some proposals have been made to achieve high-speed processes while suppressing an increase in circuit scale in an encoding apparatus, that executes an orthogonal transformation process of image data, which is segmented into blocks each consisting of a plurality of pixels, for respective segmented blocks, rearranges the transform coefficients obtained by the orthogonal transformation process in a predetermined scan order, executes a quantization process of the rearranged transform coefficients using a predetermined quantization threshold value, and encodes the quantization result. Especially, in order to improve the use efficiency of a divider with a large circuit scale in the circuit arrangement of a quantization processor, a method of comparing a plurality of pairs of orthogonally transformed coefficients and corresponding quantization threshold values at the same time to see whether the quantization result becomes zero (insignificant coefficient) or not (significant coefficient), and preferentially inputting coefficients that do not yield zero results to the divider is known.

FIG. 16 shows the arrangement of a conventional encoding apparatus.

An orthogonal transformer 9801 executes an orthogonal transformation process of image data, which is segmented into blocks each consisting of a plurality of pixels, for respective segmented blocks, and sequentially outputs obtained coefficients to a block memory 9802. This orthogonal transformer 9801 corresponds to, e.g., the 2D DCT transformation device shown in FIG. 5. The orthogonal transform coefficients output from the orthogonal transformer 9801 are written in the block memory 9802, and every two coefficients are read out in a zigzag scan order in accordance with a control signal output from a controller 9810 when the orthogonal transform coefficients for one block are written. FIG. 13 shows the zigzag scan order when each block as a unit of orthogonal transformation is formed of 8×8 elements.

Two coefficients read out from the block memory 9802 are respectively input to comparators 9803 and 9804. At the same time, the two coefficients read out from the block memory 9802 are also input to a selector 9807. On the other hand, two quantization threshold values corresponding to the two readout coefficients are read out from a quantization threshold value table 9805, and are input to the corresponding comparators 9803 and 9804. At the same time, the two readout quantization threshold values are also input to a selector 9808. The comparators 9803 and 9804 compare the input coefficients and corresponding quantization threshold values to check if the quantization result becomes zero, and output the checking results.

The checking results output from the comparators 9803 and 9804 are input to a select signal generator 9806, the controller 9810, and an entropy encoder 9811. The select signal generator 9806 generates a select signal on the basis of the checking results output from the comparators 9803 and 9804. This select signal is generated to select one or both of the two coefficients to be quantized, which does or do not generate a zero quantization result, on the basis of the two checking results output from the comparators 9803 and 9804. If neither of the quantization results of these two coefficients become zero, the select signal is generated to time-divisionally select the two coefficients one by one. If both the quantization results of these two coefficients become zero, the select signal is generated to select one of these coefficients, since the result remains the same independently of the selected coefficient.

The controller 9810 generates a read control signal from the block memory 9802 on the basis of the checking results output from the comparators 9803 and 9804. If it is determined based on the two checking results output from the comparators 9803 and 9804 that at least one of the quantization results of the two coefficients to be quantized becomes zero, the control signal instructs to read out the next two coefficients; if it is determined that neither of the quantization results of the two coefficients become zero, the control signal instructs hold the values of these two coefficients for one cycle, and to read out the next two coefficients in the next cycle. The selector 9807 selects and outputs one of the two coefficients output from the block memory 9802 in accordance with the select signal output from the select signal generator 9806. Likewise, the selector 9808 selects and outputs one of the two quantization threshold values output from the quantization threshold value table 9805 in accordance with the select signal output from the select signal generator 9806. The coefficient output from the selector 9807 and the quantization threshold value output from the selector 9808 are input to a divider 9809.

The divider 9809 quantizes the input coefficient using the input quantization threshold value, and outputs a quantization result. This quantization result is input to the entropy encoder 9811. The entropy encoder 9811 obtains position information in a block on the basis of the quantization coefficient output from the divider 9809, and the checking results output from the comparators 9803 and 9804 to count a zero runlength, and executes entropy encoding, thus outputting encoded data.

The operation of the aforementioned encoding apparatus will be described below. A case will be exemplified below wherein the quantization results of two orthogonal transform coefficients output from the block memory 9802 become as follows. Note that values in ( ) indicate pairs of coefficients output from the block memory 9802, which are described in the order they are output from the block memory 9802. Also, "0" indicates that a quantization result is zero (insignificant coefficient), and "S" indicates that a quantization result is nonzero (significant coefficient).

Quantization Results: (S, 0), (S, S), (0, S), (S, 0)

When orthogonal transform coefficients for one block output from the orthogonal transformer 9801 are written in the block memory 9802, the controller 9810 outputs the read control signal, and every two coefficients begin to be read out from the block memory 9802.

FIG. 17 is a timing chart showing the operations in the aforementioned units. The controller 9810 outputs a read instruction in a period 9901. Note that the read control signal output from the controller 9810 indicates a read instruction if it is "1", and an output hold instruction if it is "0". In a period 9902, first two coefficients (S, 0) are read out from the block memory 9802 in accordance with the read instruction signal in the period 9901. These two coefficients are input to the comparators 9803 and 9804 together with corresponding two quantization threshold values read out from the quantization threshold value table 9805. The comparators 9803 and 9804 output checking results indicating that the quantization results of the two input coefficients respectively become significant and insignificant coefficients. Note that the checking result indicates an insignificant coefficient if it is "0", and indicates a significant coefficient if it is "1".

The checking results are input to the select signal generator 9806, controller 9810, and entropy encoder 9811 in the identical period 9902. Since the input checking results meet a condition that at least one coefficient is zero, the controller 9810 outputs the next read instruction, i.e., "1" to the block memory 9802. Also, the select signal generator 9806 outputs a select signal to the selectors 9807 and 9808 to select a significant one of the two coefficients in the period 9902. In this case, the select signal is "1" in case of (S, 0), or "0" in case of (0, S). In the period 9902, the selector 9807 selects and outputs a significant one of the two coefficients output from the block memory 9802, and the selector 9808 selects and outputs a quantization threshold value corresponding to the coefficient selected by the selector 9807. In the period 9902, the coefficient output from the selector 9807 is quantized by the divider 9809 using the quantization threshold value output from the selector 9808, thus outputting a quantization result. The quantization result is input to the entropy encoder 9811, and undergoes an entropy encoding process.

In a period 9903, the next two coefficients (S, S) are read out from the block memory 9802 in accordance with the read instruction signal output from the controller 9810 in the period 9902. These two coefficients are input to the comparators 9803 and 9804 together with corresponding two quantization threshold values read out from the quantization threshold value table 9805. The comparators 9803 and 9804 output checking results indicating that both the quantization results of the two input coefficients become significant coefficients. The checking results are input to the select signal generator 9806, controller 9810, and entropy encoder 9811 in the identical period 9903. Since the input checking results meet a condition that both the coefficients are nonzero, the controller 9810 outputs an output hold instruction, i.e., "0" to the block memory 9802.

In the period 9903, the select signal generator 9806 outputs a select signal to the selectors 9807 and 9808 to select an earlier one of the two coefficients in the zigzag scan order. In the period 9903, the selector 9807 selects and outputs an earlier one of the two coefficients in the zigzag scan order, which are output from the block memory 9802, and the selector 9808 selects and outputs a quantization threshold value corresponding to the coefficient selected by the selector 9807. In the period 9903, the coefficient output from the selector 9807 is quantized by the divider 9809 using the quantization threshold value output from the selector 9808, thus outputting a quantization result. The quantization result is input to the entropy encoder 9811, and undergoes an entropy encoding process.

In a period 9904, the block memory 9802 holds and outputs the two coefficients (S, S), which were output in the period 9903, in accordance with the output hold instruction signal output from the controller 9810 in the period 9903. These two coefficients are input to the comparators 9803 and 9804 together with corresponding two quantization threshold values read out from the quantization threshold value table 9805. The comparators 9803 and 9804 output checking results indicating that both the quantization results of the two input coefficients become significant coefficients. The checking results are input to the select signal generator 9806, controller 9810, and entropy encoder 9811 in the identical period 9903. Since the input checking results meet a condition that both the coefficients are nonzero, and that condition is met in two successive cycles, the controller 9810 outputs the next read instruction, i.e., "1" to the block memory 9802. On the other hand, in the identical period 9904, the select signal generator 9806 outputs a select signal to the selectors 9807 and 9808 to select a later one of the two coefficients in the zigzag scan order. In the period 9904, the selector 9807 selects and outputs a later one of the two coefficients in the zigzag scan order, which are output from the block memory 9802, and the selector 9808 selects and outputs a quantization threshold value corresponding to the coefficient selected by the selector 9807. In the period 9904, the coefficient output from the selector 9807 is quantized by the divider 9809 using the quantization threshold value output from the selector 9808, thus outputting a quantization result. The quantization result is input to the entropy encoder 9811, and undergoes an entropy encoding process.

In a period 9905, the next two coefficients (0, S) are read out from the block memory 9802 in accordance with the read instruction signal in the period 9904. These two coefficients are input to the comparators 9803 and 9804 together with corresponding two quantization threshold values read out from the quantization threshold value table 9805. The comparators 9803 and 9804 output checking results indicating that the quantization results of the two input coefficients respectively become insignificant and significant coefficients. The checking results are input to the select signal generator 9806, controller 9810, and entropy encoder 9811 in the identical period 9905. Since the input checking results meet a condition that at least one coefficient is zero, the controller 9810 outputs the next read instruction, i.e., "1" to the block memory 9802.

In the identical period 9905, the select signal generator 9806 outputs "0" to the selectors 9807 and 9808 since the two coefficients are (0, S). In the period 9905, the selector 9807 selects and outputs a significant one of the two coefficients output from the block memory 9802, and the selector 9808 selects and outputs a quantization threshold value corresponding to the coefficient selected by the selector 9807. In the period 9905, the coefficient output from the selector 9807 is quantized by the divider 9809 using the quantization threshold value output from the selector 9808, thus outputting a quantization result. The quantization result is input to the entropy encoder 9811, and undergoes an entropy encoding process.

In a period 9906, the next two coefficients (S, 0) are read out from the block memory 9802 in accordance with the read instruction signal in the period 9905. These two coefficients are input to the comparators 9803 and 9804 together with corresponding two quantization threshold values read out from the quantization threshold value table 9805. The comparators 9803 and 9804 output checking results indicating that the quantization results of the two input coefficients respectively become significant and insignificant coefficients. The checking results are input to the select signal generator 9806, controller 9810, and entropy encoder 9811 in the identical period 9906. Since the input checking results meet a condition that at least one coefficient is zero, the controller 9810 outputs the next read instruction, i.e., "1" to the block memory 9802.

In the identical period 9906, the select signal generator 9806 outputs "1" to the selectors 9807 and 9808 since the two coefficients are (S, 0). In the period 9906, the selector 9807 selects and outputs a significant one of the two coefficients output from the block memory 9802, and the selector 9808 selects and outputs a quantization threshold value corresponding to the coefficient selected by the selector 9807. In the period 9906, the coefficient output from the selector 9807 is quantized by the divider 9809 using the quantization threshold value output from the selector 9808, thus outputting a quantization result. The quantization result is input to the entropy encoder 9811, and undergoes an entropy encoding process. After that, the encoding process is repeated similarly.

In a decoding apparatus for decoding encoded data, as a technique for dequantizing quantized data, which is obtained by quantizing data having a given domain using a quantization threshold value having another domain, to data of the original domain, a conventional method of implementing such technique using a multiplier and clamp circuit is known. The multiplier and clamp circuit will be described below. In the following description, a case will be exemplified wherein quantized data, which is obtained by quantizing data having a domain from 0 to 1024 using a quantization threshold value having a domain from 1 to 255, is dequantized to data having the domain from 0 to 1024. FIG. 21 shows an example of the arrangement of a conventional dequantization device. The conventional dequantization device will be described below with reference to FIG. 21.

Reference numeral 91301 denotes a multiplier for multiplying input quantized data by a quantization threshold value to obtain a product, and outputting the product. The domain of the input quantized data is expressed by 11 bits since it ranges from 0 to 1024. Also, the domain of the quantization threshold value is expressed by 9 bits since it ranges from 0 to 255. Therefore, the size of the multiplier 91301 is 11 bits×8 bits. Reference numeral 91302 denotes a clamp circuit. When the output from the multiplier 91301 exceeds 1024 as the upper limit of the original domain, the clamp circuit 91302 outputs 1024; otherwise, the clamp circuit 91302 outputs the value output from the multiplier 91301. The output from the clamp circuit 91302 is the dequantized value to be obtained.

In the aforementioned arrangement of the conventional encoding apparatus shown in FIG. 5, since input of data in the last row of data that have undergone the first one-dimensional DCT to the transposition converter 502, and output of first data after transposition conversion from the transposition converter 502 cannot be made within an identical clock cycle unless a special RAM is used, the output timing must be delayed one clock cycle, and sufficiently high-speed processing cannot be achieved.

The present invention has been made in consideration of the aforementioned prior arts, and has as its first object to provide an image processing method and apparatus, which can execute high-speed 2D orthogonal transformation.

In the aforementioned conventional encoding apparatus shown in FIG. 16, since the input frequency of insignificant coefficients to the divider increases depending on the distribution of insignificant and significant coefficients in a unit block, the use efficiency of the divider lowers, and sufficiently high-speed processing cannot be achieved.

In the conventional decoding apparatus and, especially, the dequantization device, although the size of the multiplier is input 11 bits×8 bits, most of actual products fall within the range from 0 to 1024, and full 19 bits are rarely required as the output of the multiplier. Furthermore, in a system in which it is guaranteed that the dequantization result falls within the range from 0 to 1024, the output of the multiplier never exceeds 11 bits. Hence, due to the presence of many useless portions of the multiplier, the use efficiency of the multiplier suffers, and high-speed processing cannot be achieved.

The present invention has been made in consideration of the aforementioned prior arts, and has as its second object to execute a faster quantization process with a smaller circuit scale. Also, the present invention has as its third object to dequantize quantized data faster with a smaller circuit scale when the maximum value of dequantized data is set.

SUMMARY OF THE INVENTION

In order to achieve the object of the present invention, for example, an image processing apparatus of the present invention has the following arrangement.

There is provided an image processing apparatus for receiving every n data of image data which has been segmented into rectangular blocks each consisting of n×n data, and applying two-dimensional orthogonal transforms to the received data, comprising:

one-dimensional orthogonal transformation means for applying one-dimensional orthogonal transforms to the n inputs, and outputting n coefficients;

transposition conversion means for transposing n×n coefficients output from the one-dimensional orthogonal transformation means, and outputting every n coefficients;

first selection means for selecting either a predetermined number m (0<m<n) of coefficients of the n coefficients output from the transposition conversion means, or the predetermined number m (0<m<n) of coefficients of the n coefficients output from the one-dimensional orthogonal transformation means; and second selection means for selecting either the n image data, or n data as a combination of the predetermined number m of coefficients selected by the first selection means and remaining (n−m) coefficients, which are not input to the first selection means, of the n coefficients output from the transposition conversion means, and supplying the selected data as n data to the one-dimensional orthogonal transformation means.

In order to achieve the object of the present invention, for example, an image processing method of the present invention has the following arrangement.

There is provided an image processing method for receiving every n data of image data which has been segmented into rectangular blocks each consisting of n×n data, and applying two-dimensional orthogonal transforms to the received data, comprising:

the one-dimensional orthogonal transformation step of applying one-dimensional orthogonal transforms to the n inputs, and outputting n coefficients;

the transposition conversion step of transposing n×n coefficients output in the one-dimensional orthogonal transformation step, and outputting every n coefficients;

the first selection step of selecting either a predetermined number m (0<m<n) of coefficients of the n coefficients output in the transposition conversion step, or the predetermined number m (0<m<n) of coefficients of the n coefficients output in the one-dimensional orthogonal transformation step; and the second selection step of selecting either the n image data, or n data as a combination of the predetermined number m of coefficients selected in the first selection step and remaining (n−m) coefficients, which are not input to the first selection step, of the n coefficients output in the transposition conversion step, and supplying the selected data as n data to the one-dimensional orthogonal transformation step.

In order to achieve the object of the present invention, for example, an image processing apparatus of the present invention has the following arrangement.

There is provided an image processing apparatus for quantizing a transform coefficient group obtained by orthogonal transformation, comprising:

storage means for storing the transform coefficient group;

quantization means for quantizing a transform coefficient of a DC component and transform coefficients, quantization results of which assume values other than zero, of the transform coefficient group; and output means for outputting position information indicating positions of transform coefficients to be quantized by the quantization means in the storage means together with quantization results of the quantization means to means for entropy-encoding the quantization results.

In order to achieve the object of the present invention, for example, an image processing apparatus of the present invention has the following arrangement.

There is provided an image processing apparatus for generating dequantized data by executing a dequantization process of quantized data, comprising:

bit-shift means for bit-shifting a quantized data, the quantized data and a quantization threshold value are that a maximum value of the dequantized data is a predetermined value, to generate data indicating a quantized value corresponding to an even number multiple of the quantized data, addition means for generating data indicating a quantized value corresponding to an odd number multiple of the quantized data by adding the quantized data and the data indicating the quantized value corresponding to the even number multiple of the quantized data, which is generated by the bit-shift means;

multiplication means for multiplying the quantized data and the quantization threshold value; and selection means for selecting an operation result of one of the bit-shift means, addition means, and multiplication means, or the quantized data in accordance with the quantization threshold value, and outputting the selected data as the dequantized data.

In order to achieve the object of the present invention, for example, an image processing apparatus of the present invention has the following arrangement.

There is provided an image processing apparatus for receiving every n data of image data which has been segmented into rectangular blocks each consisting of n×n data, applying two-dimensional orthogonal transforms to the received data, and quantizing transform coefficients obtained by the two-dimensional orthogonal transformation, comprising:

one-dimensional orthogonal transformation means for applying one-dimensional orthogonal transforms to the n inputs, and outputting n coefficients;

transposition conversion means for transposing n×n coefficients output from the one-dimensional orthogonal transformation means, and outputting every n coefficients;

first selection means for selecting either a predetermined number m (0<m<n) of coefficients of the n coefficients output from the transposition conversion means, or the predetermined number m (0<m<n) of coefficients of the n coefficients output from the one-dimensional orthogonal transformation means;

second selection means for selecting either the n image data, or n data as a combination of the predetermined number m of coefficients selected by the first selection means and remaining (n−m) coefficients, which are not input to the first selection means, of the n coefficients output from the transposition conversion means, and supplying the selected data as n data to the one-dimensional orthogonal transformation means; and quantization means for quantizing a transform coefficient of a DC component and transform coefficients, quantization results of which assume values other than zero, of the n×n transform coefficients obtained by the one-dimensional orthogonal transformation means.

In order to achieve the object of the present invention, for example, an image processing method of the present invention has the following arrangement.

There is provided an image processing method for quantizing a transform coefficient group obtained by orthogonal transformation, comprising:

the storage step of storing the transform coefficient group in a memory;

the quantization step of quantizing a transform coefficient of a DC component and transform coefficients, quantization results of which assume values other than zero, of the transform coefficient group; and the output step of outputting position information indicating positions of transform coefficients to be quantized in the quantization step in the memory together with quantization results of the quantization step to means for entropy-encoding the quantization results.

In order to achieve the object of the present invention, for example, an image processing method of the present invention has the following arrangement.

There is provided an image processing method for generating dequantized data by executing a dequantization process of quantized data, comprising:

the bit-shift step of bit-shifting a quantized data, the quantized data and a quantization threshold value are that a maximum value of the dequantized data is a predetermined value, to generate data indicating a quantized value corresponding to an even number multiple of the quantized data, the addition step of generating data indicating a quantized value corresponding to an odd number multiple of the quantized data by adding the quantized data and the data indicating the quantized value corresponding to the even number multiple of the quantized data, which is generated in the bit-shift step;

the multiplication step of multiplying the quantized data and the quantization threshold value; and the selection step of selecting an operation result of one of the bit-shift step, the addition step, and the multiplication step, or the quantized data in accordance with the quantization threshold value, and outputting the selected data as the dequantized data.

In order to achieve the object of the present invention, for example, an image processing method of the present invention has the following arrangement.

There is provided an image processing method for receiving every n data of image data which has been segmented into rectangular blocks each consisting of n×n data, applying two-dimensional orthogonal transforms to the received data, and quantizing transform coefficients obtained by the two-dimensional orthogonal transformation, comprising:

the one-dimensional orthogonal transformation step of applying one-dimensional orthogonal transforms to the n inputs, and outputting n coefficients;

the transposition conversion step of transposing n×n coefficients output in the one-dimensional orthogonal transformation step, and outputting every n coefficients;

the first selection step of selecting either a predetermined number m (0<m<n) of coefficients of the n coefficients output in the transposition conversion step, or the predetermined number m (0<m<n) of coefficients of the n coefficients output in the one-dimensional orthogonal transformation step;

the second selection step of selecting either the n image data, or n data as a combination of the predetermined number m of coefficients selected in the first selection step and remaining (n−m) coefficients, which are not input in the first selection step, of the n coefficients output in the transposition conversion step, and supplying the selected data as n data to the one-dimensional orthogonal transformation step; and the quantization step of quantizing a transform coefficient of a DC component and transform coefficients, quantization results of which assume values other than zero, of the n×n transform coefficients obtained in the one-dimensional orthogonal transformation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A is a view for explaining positional correspondence of data in rectangles in the first embodiment of the present invention;

FIG. 3B is a view for explaining positional correspondence of data in rectangles in the first embodiment of the present invention;

FIG. 3C is a view for explaining positional correspondence of data in rectangles in the first embodiment of the present invention;

FIG. 4A is a view for explaining the scan direction of an image;

FIG. 4B is a view for explaining the scan direction of an image;

FIG. 13 shows the zigzag scan order when a block serving as a unit of orthogonal transformation consists of 8×8 pixels;

FIG. 14 shows an example of the distribution of the quantization results of coefficients in a unit block when the unit block of orthogonal transformation consists of 8×8 pixels;

FIG. 15 shows a state wherein every two coefficients line up in the zigzag scan order in the example shown in FIG. 14;

FIG. 19 is a table showing the maximum values of quantized data, whose products corresponding to respective quantization threshold values do not exceed 1024, corresponding bit values, and means used in dequantization;

DETAILED DESCRIPTION OF THE PREFERRED EMBODIMENTS

Preferred embodiments of the present invention will now be described in detail in accordance with the accompanying drawings.

[First Embodiment]

Figure 1:
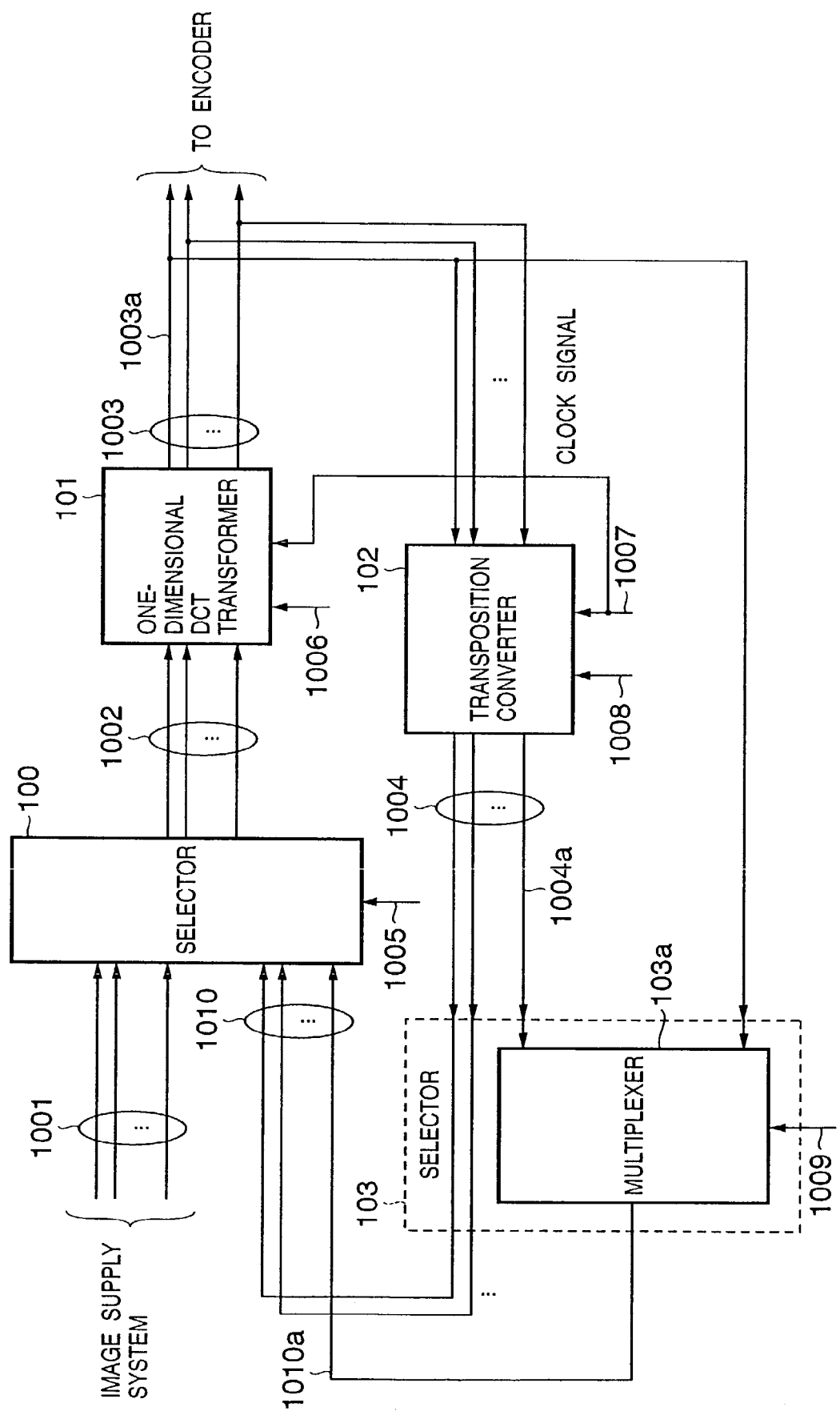
FIG. 1 is a block diagram for explaining the arrangement of a 2D DCT transformation device in an encoding apparatus according to the first embodiment of the present invention.

FIG. 1 is a block diagram showing the arrangement of a 2D DCT transformation device in an encoding apparatus according to this embodiment. Note that this embodiment will explain a case wherein n indicating the number of input data is set to be n=8, and the value of a predetermined number m selected from the n inputs is set to be "1".

Referring to FIG. 1, reference numeral 1001 denotes eight signal lines, which are used to transfer eight inputs input from an image supply system (not shown, and are connected to a selector 100. The selector 100 selects eight inputs sent via the signal supply lines 1001, or eight inputs (outputs of a selector 103) sent via signal lines 1010 including eight signal lines, in accordance with a control signal input via a signal line 1005, and supplies data from the selected eight input signal lines onto signal lines 1002. These signal lines 1002 connect the outputs of the selector 100 to a one-dimensional DCT transformer 101.

The one-dimensional DCT transformer 101 applies the one-dimensional DCTs to the eight inputs, which are input via the signal lines 1002, in accordance with a clock signal input via a signal line 1007 and an output timing control signal input via a signal line 1006, and outputs eight one-dimensional DCT transform coefficients onto signal lines 1003. Note that a signal line, on which lowest-frequency component data appears, of the eight signal lines 1003 will be especially referred to as a signal line 1003a.

The signal lines 1003 except for this signal line 1003a are branched into two systems, one of which is connected to a quantizer (81 in FIG. 8), and the other of which is connected to a transposition converter 102. The signal line 1003a is further branched into three lines, one of which is connected to the quantizer (81 in FIG. 8), another one of which is connected to the transposition converter 102, and the remaining one of which is connected to the selector 103.

The transposition converter 102 has a block memory having a capacity capable of storing 8×8 coefficients input via the signal lines 1003, and writes (8×8−1) coefficients input via the signal lines 1003 in that block memory. After that, the converter 102 transposes and reads out the written data, and outputs every eight coefficients onto eight signal lines 1004 in accordance with the clock signal (1007) and a control signal input via a signal line 1008. Of these signal lines 1004, a signal line on which highest-frequency component data appears will be especially referred to as a signal line 1004a.

The selector 103 selects eight data from eight data sent from the transposition converter 102 via the signal lines 1004, and the lowest-frequency component data sent via the signal line 1003a in accordance with a control signal sent via a signal line 1009, and outputs the selected data onto eight signal lines 1010. Of these signal lines 1010, a signal line on which highest-frequency component data appears will be especially referred to as a signal line 1010a.

In this embodiment, the selector 103 includes a multiplexer 103a, which selects one of the highest-frequency component data sent via the signal line 1004a, and the lowest-frequency component data sent via the signal line 1003a, in accordance with the control signal (1009), and outputs the selected data onto the signal line 1010a. The selector 103 directly outputs signals of the signal lines 1004 except for the signal line 1004a onto the seven signal lines 1010 except for the signal line 1010a.

The overall operation will be described below using FIG. 1 and the timing charts in FIGS. 2A and 2B.

Figure 2A:
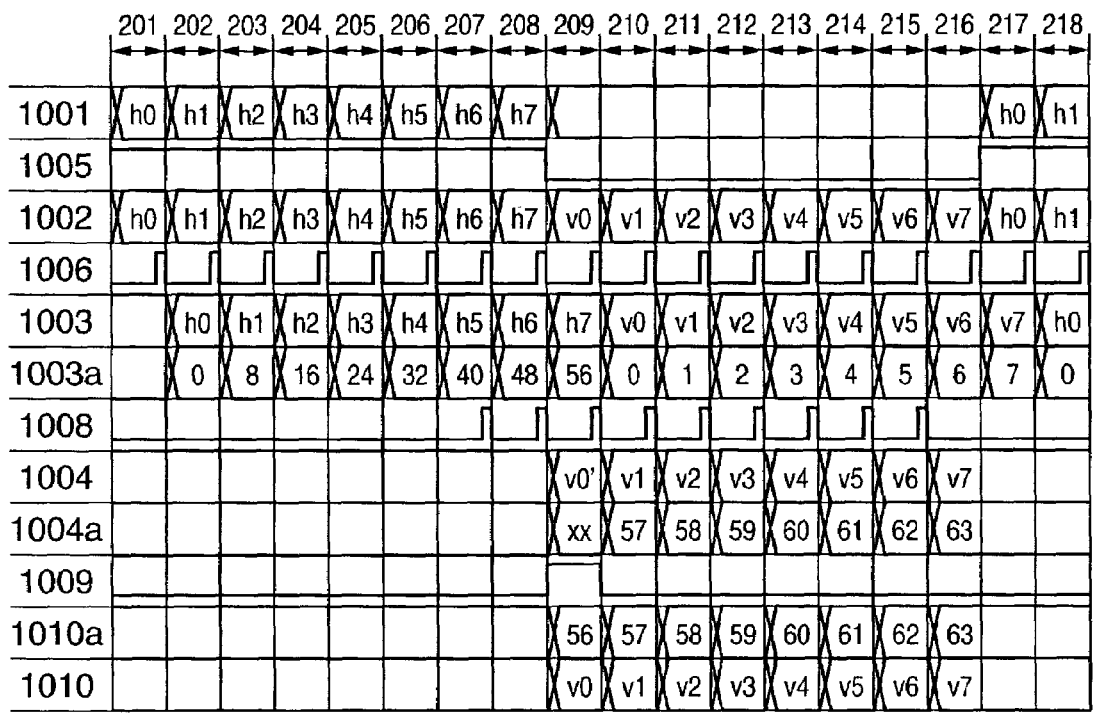
FIG. 2A is a timing chart for explaining the processes in the 2D DCT transformation device according to the first embodiment of the present invention.
Figure 2B:
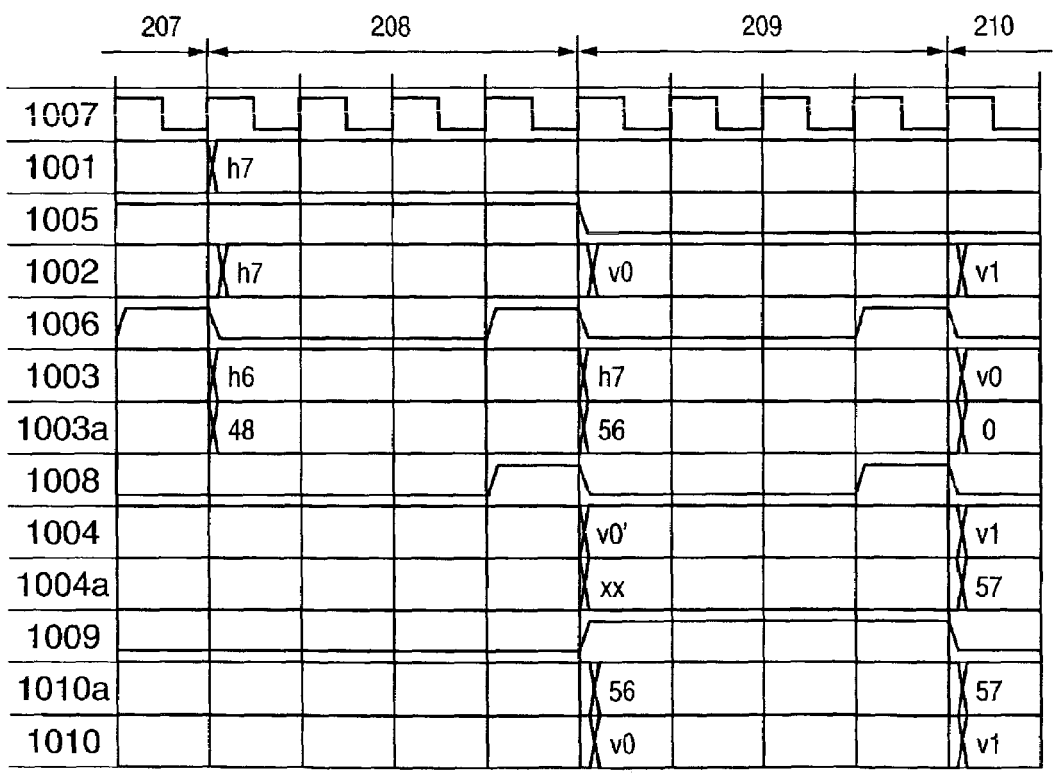
FIG. 2B is a timing chart for explaining the processes in the 2D DCT transformation device according to the first embodiment of the present invention.
Figure 5:
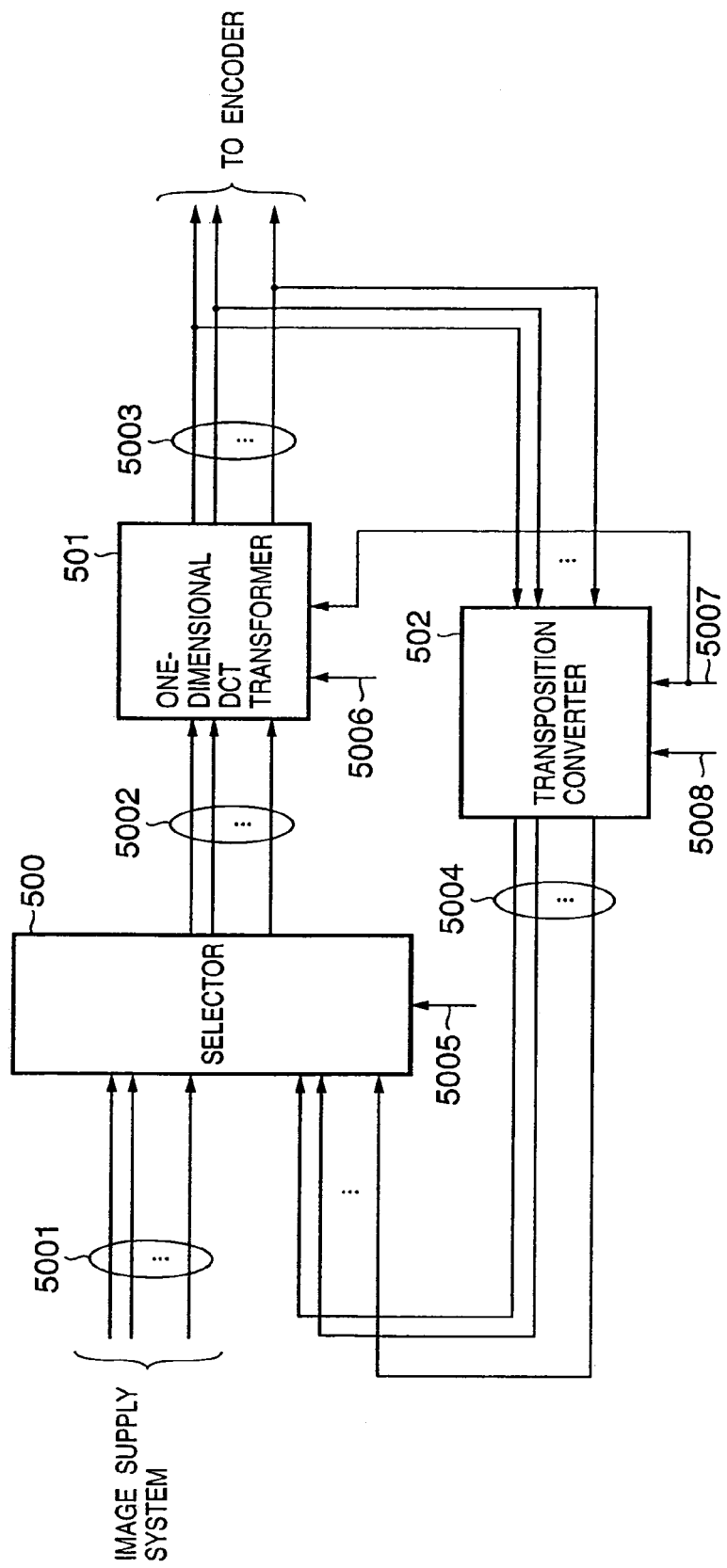
FIG. 5 is a block diagram for explaining the circuit arrangement for executing the 2D DCTs in a conventional encoding apparatus.
Figure 6A:
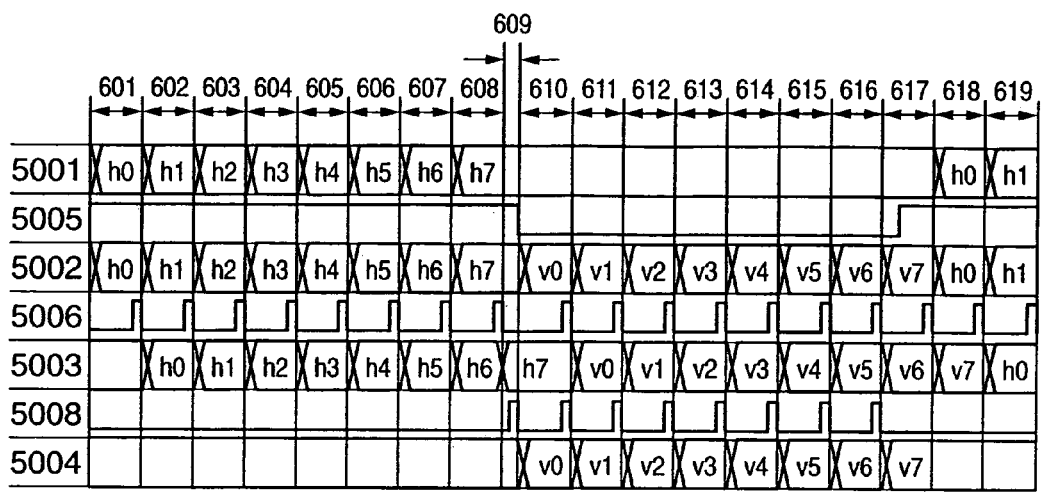
FIG. 6A is a timing chart for explaining the processes in the conventional encoding apparatus.
Figure 6B:
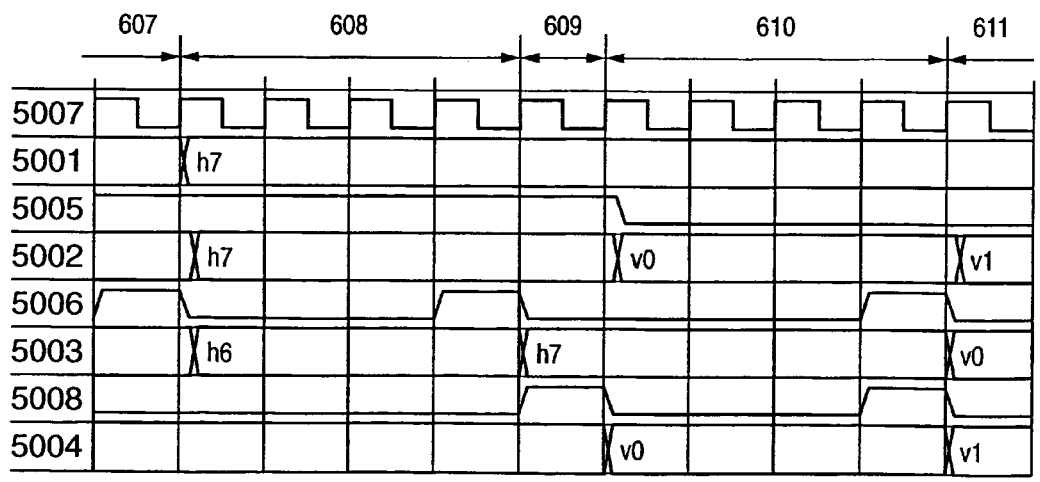
FIG. 6B is a timing chart for explaining the processes in the conventional encoding apparatus.

Please refer to FIGS. 3A and 3B used in the description of the prior arts for the meanings of "h0" to "h7" and "v0" to "v7" in FIGS. 2A and 2B. Also, numerical values in the columns of 1003a, 1004a, and 1010a in FIGS. 2A and 2B correspond to the position numbers in 8×8 rectangular blocks shown in FIG. 3A.

At the head of a period 201 in the timing chart of FIG. 2A, first eight data are input via the signal lines 1001. These first eight data are represented by "h0" in FIG. 2A, and correspondence between "h0" and the position numbers in the 8×8 rectangular blocks shown in FIG. 3A is as shown in FIG. 3B.

As shown in FIG. 3B, each of "h0" to "h7" consists of eight data selected in the horizontal raster scan order. In the period 201, the control signal (1005) to be input to the selector 100 indicates "1" in the column of 1005 in FIG. 2A.

In this embodiment, when the control signal (1005) to be input to the selector 100 is "0", the selector 100 selects signals on the signal lines 1010 as the transposition results; when the control signal is "1", the selector 100 selects signals on the signal lines 1001. Therefore, in the period 201, data on the signal lines 1001, i.e., "h0", appear on the signal lines 1002.

Likewise, at the heads of respective periods 202 to 208, data "h1" to "h7" are input to the selector 100 via the signal lines 1001, are output onto the signal lines 1002 in accordance with the control signal (1005), and are supplied to the one-dimensional DCT transformer 101. At this time, the control signal (1005) is "1" during the periods 201 to 208. Therefore, the selector 100 selects data on the signal lines 1001 and outputs them onto the signal lines 1002 in the periods 201 to 208.

In the period 201, the data "h0" output from the selector 100 are input to the one-dimensional DCT transformer 101 via the signal lines 1002. In this embodiment, the one-dimensional DCT transformer 101 outputs transformed coefficients in synchronism with the leading edge of the clock signal (1007) when the value of the control signal (1006) is "1".

As shown in FIG. 2A, the value of the control signal (1006) changes to "1" at the end of each of the periods 201 to 218. The data "h0" input to the one-dimensional DCT transformer 101 in the period 201 undergo one-dimensional DCT transformation, and transform coefficients are output onto the signal lines 1003 at the head of the period 202 in accordance with the control signal (1006) and clock signal (1007).

Likewise, the data "h1" to "h7" input to the one-dimensional DCT transformer 101 at the heads of the respective periods 202 to 208 undergo one-dimensional DCT transformation, and are output onto the signal lines 1003 at the heads of the respective periods 203 to 209. Especially, values (lowest-frequency component) output onto the signal line 1003a are as shown in FIG. 2A at the heads of the respective periods 202 to 209.

The data "h0" to "h7" output from the one-dimensional DCT transformer 101 onto the signal lines 1003 at the heads of the periods 202 to 209 are input to the transposition converter 102 so as to undergo transposition conversion, and are sequentially written in the block memory having the capacity capable of storing 64 data in the transposition converter 102. However, data corresponding to position number "56" in the 8×8 rectangular blocks shown in FIG. 3A (to be simply referred to as data corresponding to position number "56" hereinafter) is controlled not to be written. Assume that this internal block memory undergoes write or read access in synchronism with the clock signal (1007). Also, the transposition converter 102 outputs data in synchronism with the leading edge of the clock signal (1007) when the value of the control signal (1008) is "1".

In this manner, the data "h0" to "h7" except for the data corresponding to position number "56" are written in the internal block memory of the transposition converter 102, and are read out in the vertical raster scan order, thus outputting every eight data in accordance with the control signal (1008) and clock signal (1007). Eight data which are output in this way are indicated by "v0'" and "v1" to "v7" in FIG. 2A. Note that "v0'" includes data with position numbers "0, 8, 16, 24, 32, 40, 48, xx" in the 8×8 rectangular blocks shown in FIG. 3A. In this case, the data corresponding to position number "56" is excluded, and is indicated by "xx" that means "don't care", i.e., an arbitrary value.

At this time, the control signal (1008) changes to "1" at the end of each of the periods 208 to 215, as shown in FIG. 2A. Therefore, the data "v0'" and "v1" to "v7" are sequentially output from the transposition converter 102 onto the signal lines 1004 at the heads of the respective periods 209 to 216. Especially, values output onto the signal line 1004a are as shown in FIG. 2A at the heads of the respective periods 209 to 216. Especially, a value (xx) output at the head of the period 209 is "don't care" (xx). This is because when the value corresponding to position number "56" in the 8×8 rectangular blocks is written in and read out from the block memory, that value cannot be output at the head of the period 209.

The signal lines 1004, which are output from the transposition converter 102 and include eight signal lines, are input to the selector 103. Especially, the signal line 1004a is input to the multiplexer 103a included in the selector 103. The multiplexer 103a selects one of the value (highest-frequency component) input via the signal line 1004a and the value (lowest-frequency component) input via the signal line 1003a in accordance with the control signal (1009), and outputs the selected value onto the signal line 1010a.

In this embodiment, the multiplexer 103a outputs, onto the signal line 1010a, the value (highest-frequency component) on the signal line 1004a when the control signal (1009) is "0"; the value (lowest-frequency component) on the signal line 1003a when the control signal is "1". As shown in FIG. 2A, the control signal (1009) changes to "1" in the period 209. Therefore, the value on the signal line 1010a in the period 209 is that on the signal line 1003a, i.e., the value corresponding to the position number "56" in the 8×8 rectangular blocks shown in FIG. 3A.

As a result, values shown in FIG. 2A are output onto the signal line 1010a at the heads of the respective periods 209 to 216. Also, of the signal lines 1010 including eight signal lines, seven signal lines except for the signal line 1010a are connected to seven signal lines except for the signal line 1004a of the signal lines 1004 including eight signal lines. Consequently, the data "v0" to "v7" are output onto the signal lines 1010 at the heads of the respective periods 209 to 216, as shown in FIG. 2A.

FIG. 2B shows the operations in the periods 208 and 209 in more detail. FIG. 2B also shows the clock signal (1007) which is not shown in FIG. 2A.

The data "v0" to "v7" that have undergone transposition conversion are input to the selector 100 via the signal lines 1010. The control signal (1005) is switched to "0" at the head of the period 209 to select the signal lines 1010, so as to implement the second one-dimensional DCT transformation. Therefore, the data "v0" to "v7" are sequentially output from the selector 100 onto the signal lines 1002 and are input to the one-dimensional DCT transformer 101 at the heads of the respective periods 209 to 216. The data "v0" to "v7" input to the one-dimensional DCT transformer 101 undergo the second one-dimensional DCT transformation by the one-dimensional DCT transformer 101. The transformation results are sequentially output onto the signal lines 1003 at the heads of the respective periods 210 to 217 in accordance with the control signal (1006). The data, which are sequentially output at the heads of the respective periods 210 to 217, have undergone the two one-dimensional DCT transformation processes via transposition conversion, and are consequently equivalent to the 2D DCT transformation result.

Subsequently, the control signal (1005) is switched to "1" at the head of the period 217 so as to select the signal lines 1001 and to receive the next 8×8 rectangular block data.

First eight data "h0" of the next 8×8 rectangular blocks are input from the image supply system (not shown) to the selector 100 via the signal lines 1001 at the head of the period 217. After that, DCT transformation is similarly done every 8×8 rectangular blocks.

Figure 7:
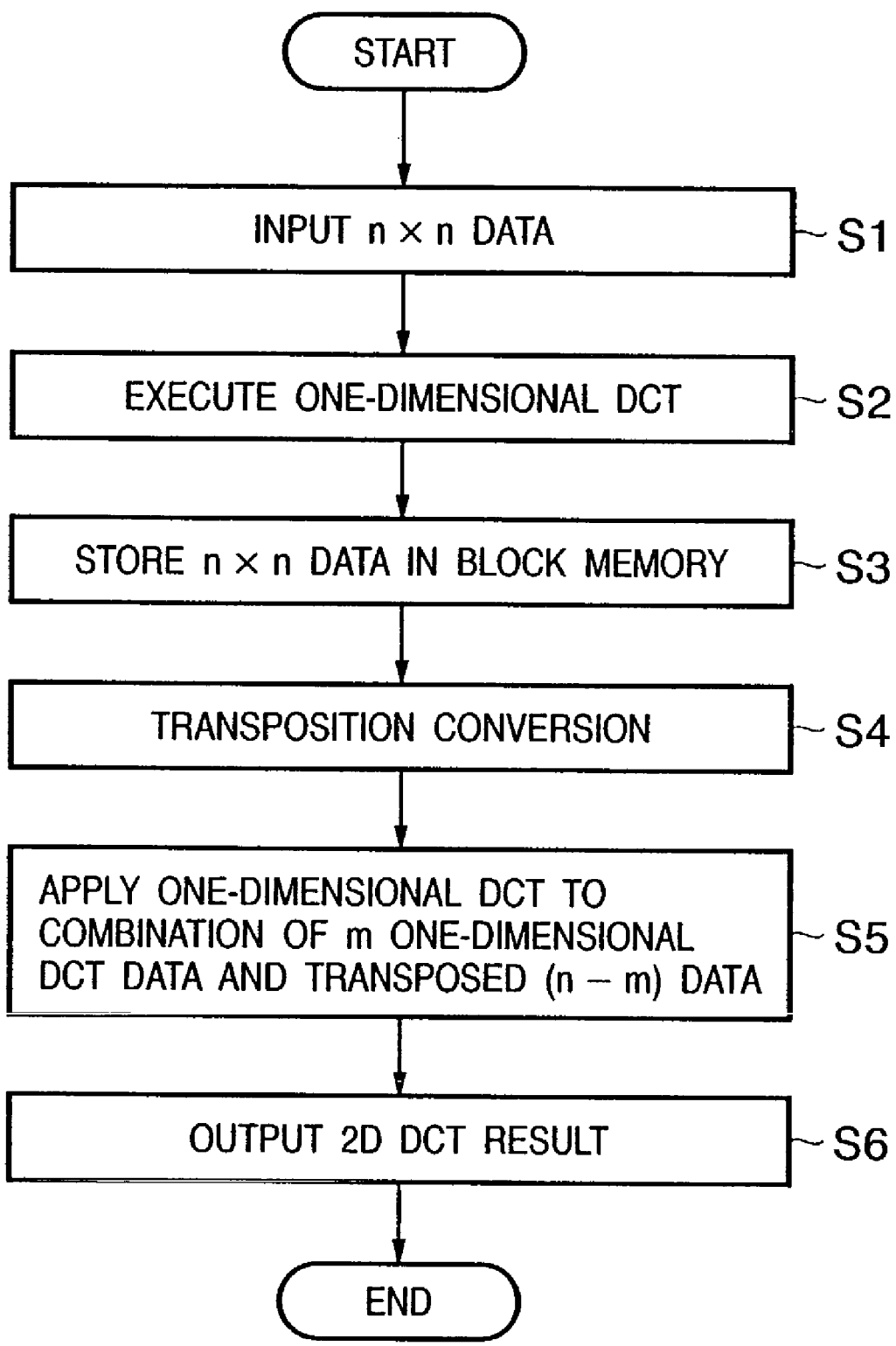
FIG. 7 is a flow chart for explaining a 2D DCT process according to the first embodiment of the present invention.

FIG. 7 is a flow chart for explaining the 2D DCT transformation in the encoding apparatus according to this embodiment.

In step S1, image data consisting of n×n data is input, and is output to the one-dimensional DCT transformer 101 to undergo one-dimensional DCT transformation (step S2). The one-dimensional DCT transformation results are output to the transposition converter 102 and are stored in the internal memory (step S3). The transposition converter 102 transposes n×n blocks (step S4). The flow advances to step S5 to combine m one-dimensional DCT data and transposed (n−m) data, and to apply the one-dimensional DCTs to these data. In this manner, the 2D DCT execution result is obtained, and is output in step S6.

Figure 8:
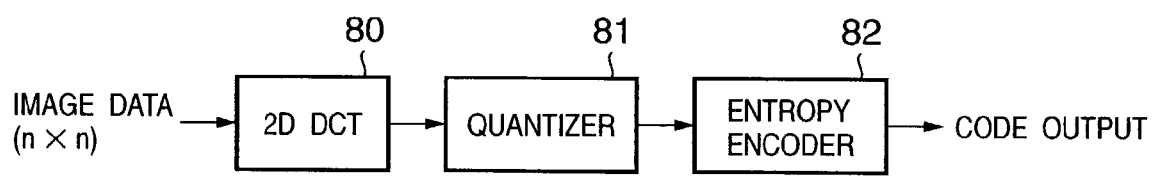
FIG. 8 is a block diagram showing the arrangement of an encoding apparatus according to the first embodiment of the present invention.

FIG. 8 is a block diagram showing the arrangement of the encoding apparatus according to this embodiment.

Referring to FIG. 8, reference numeral 80 denotes a 2D DCT transformer, which comprises the aforementioned arrangement shown in FIG. 1. Reference numeral 81 denotes a quantizer which quantizes each of coefficients transformed by the 2D DCT transformer 80 in accordance with a predetermined quantization step. Reference numeral 82 denotes an entropy encoder, which executes entropy encoding on the basis of values quantized by the quantizer 81.

According to the aforementioned conventional arrangement, the number of clock cycles required to execute the 2D DCT process of 8×8 rectangular blocks is 65. By contrast, according to the arrangement of the above embodiment, the number of clock cycles required to execute the 2D DCT process of 8×8 rectangular blocks is 64, and the processing time can be shortened by one cycle every 8×8 rectangular blocks compared to the conventional arrangement.

In this embodiment, 2D DCT (discrete cosine transformation) has been explained as an example of orthogonal transformation. However, the present invention is not limited to such specific transformation. For example, the present invention can be applied to 2D discrete wavelet transformation, Hadamard transformation, and the like.

[Second Embodiment]

As described above, in order to attain compression encoding of an image, image must undergo orthogonal transformation, and transform coefficients obtained by the orthogonal transformation must be quantized. In order to attain this compression encoding process faster than the conventional process, respective processes must be speeded up. In this case, orthogonal transformation can be done faster than the conventional process by the first embodiment. Hence, in this embodiment, a quantization method that attains a quantization process as a post-process of the orthogonal transformation faster than the conventional process will be explained. Note that a quantization device according to this embodiment need not always be used together with the 2D DCT transformation device according to the first embodiment.

Figure 9:
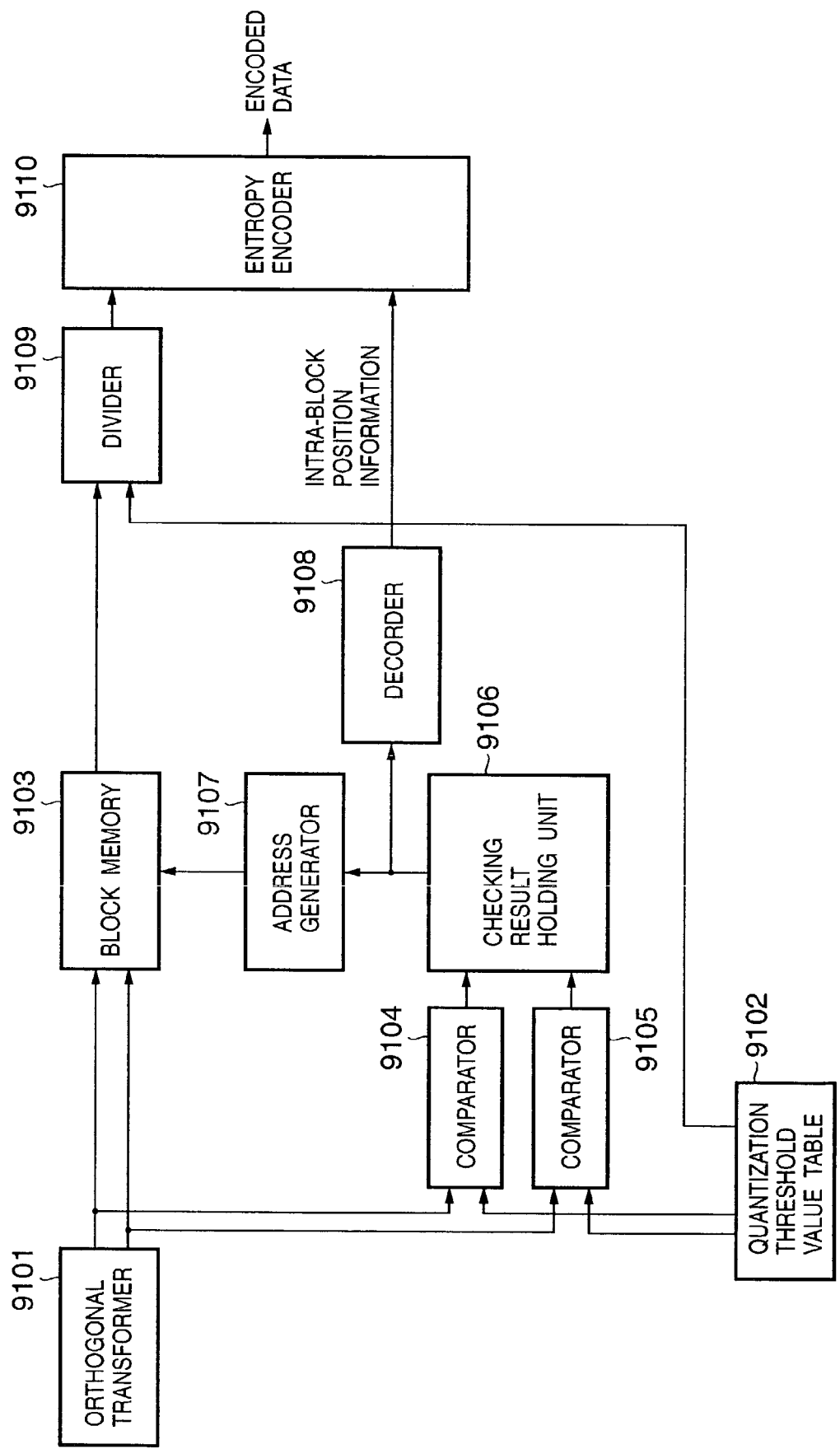
FIG. 9 is a block diagram showing the arrangement of an encoding apparatus according to the second embodiment of the present invention.

FIG. 9 shows the arrangement of an encoding apparatus according to this embodiment. Assume that a unit block of orthogonal transformation consists of 8×8 elements.

An orthogonal transformer 9101 executes an orthogonal transformation process of image data, which is segmented into blocks each consisting of a plurality of pixels, for respective segmented blocks, and sequentially outputs every two orthogonally transformed coefficients. As orthogonal transformation, for example, DCT (discrete cosine transformation) or the like may be used and, in such case, the 2D DCT transformation device according to the first embodiment may be used as the orthogonal transformer 9101.

Two coefficients output from the orthogonal transformer 9101 are input to a block memory 9103, and comparators 9104 and 9105. Every two orthogonal transform coefficients output from the orthogonal transformer 9101 are written in the block memory 9103 for each block, and when orthogonal transform coefficients for one block are written, the written coefficients are read out one by one in the zigzag scan order in accordance with read addresses output from an address generator 9107. Each coefficient read out from the block memory 9103 is input to a divider 9109. At the same time, the two coefficients output from the orthogonal transformer 9101 are respectively input to the comparators 9104 and 9105, which respectively compare the input coefficients with two quantization threshold values read out from a quantization threshold value table 9102 to check if a quantization result becomes zero, and output the checking results.

The quantization threshold value table 9102 includes two RAMs which can be accessed at the same time. From one RAM (address), two quantization threshold values corresponding to the coefficients input to the comparators 9104 and 9105 are read out, and from the other RAM (address), a quantization threshold value corresponding to the coefficient input to the divider 9109 is read out. A checking result holding unit 9106 sequentially receives the checking results output from the comparators 9104 and 9105, and holds the checking results for one blocks. The checking result is represented by 0 if the quantization result of the checked coefficient becomes zero (insignificant coefficient), and by 1 if the quantization result does not become zero (significant coefficient). The checking results for one blocks held in the checking result holding unit 9106 are output to the address generator 9107 and a decoder 9108.

The address generator 9107 generates read addresses from the block memory 9103 on the basis of the checking results for one blocks held in the checking result holding unit 9106. In a generation method of read addresses, only addresses where significant coefficients of those for one block are stored are generated for one cycle in a zigzag scan order. The generated read address is output to the block memory 9103, which outputs a coefficient stored at the received read address, i.e., a significant coefficient. When the block memory 9103 outputs the last significant coefficient, the block read process ends. Note that the DC component is always read out irrespective of whether or not it is a significant coefficient.

The decoder 9108 generates and outputs position information in a block of each coefficient read out from the block memory 9103 on the basis of the checking results for one block held in the checking result holding unit 9106. The position information of each of only significant coefficients of those for one block is sequentially generated for one cycle in the zigzag scan order. Note that the position information of the DC component is always generated irrespective of whether or not it is a significant coefficient. As a preferred example as the contents of the position information, the position information of the DC component assumes a value obtained by subtracting 1 from the number of pixels of a unit block that the orthogonal transformer 9101 executes an orthogonal transformation process, i.e., a value "63" since the number of pixels of the unit block in this embodiment is 64 (=8×8). As for the AC component, the number of insignificant coefficients present between the immediately preceding significant coefficient and the significant coefficient of interest in the zigzag scan order is used as the position information. As for the first significant coefficient next to the DC component in the zigzag scan order, the number of insignificant coefficients present between that DC component and itself is used as the position information.

When the position information is generated in this manner, the maximum value of the position information corresponding to a significant coefficient of an AC component is a value obtained by subtracting 2 from the number of pixels of the unit bloc, i.e., 62 in this embodiment. That is why the value "63" is assigned to the position information corresponding to the DC component. Since a value outside the value range that the position information corresponding to an AC component can assume is assigned to the position information corresponding to the DC component, the DC component can be easily identified by that value, and the number of bits required to express position information can be minimized. Of course, a value other than 63 may be assigned as long as it falls outside the value range that the position information corresponding to another AC component can assume. Identifying the DC component is required to detect the boundary of unit blocks of orthogonal transformation. The subsequent entropy encoder 9110 can determine that a coefficient received immediately before reception of the DC component was the last significant coefficient in a given unit block of orthogonal transformation. Also, the position information generated in this way can serve as effective information upon zero runlength encoding.

An example of position information generation will be explained below using FIG. 14. FIG. 14 shows an example of the distribution of quantization results of coefficients in a unit block when the unit block of orthogonal transformation consists of 8×8 elements. In FIG. 14, "S" indicates a significant coefficient, and "0" indicates an insignificant coefficient. Position information corresponding to the DC component to be processed first is 63. Position information corresponding to the second significant coefficient counted in the zigzag scan order is 0 since no insignificant coefficient is present between the DC component and itself. Position information corresponding to each of the third to 10th significant coefficients counted in the zigzag scan order is 0 since no insignificant coefficient is present between the immediately preceding significant coefficient and the significant coefficient of interest. Position information corresponding to the 11th significant coefficient counted in the zigzag scan order is 2 since there are two insignificant coefficients between the immediately preceding significant coefficient and the significant coefficient of interest. A plurality of pieces of position information corresponding to the 12th and subsequent significant coefficients counted in the zigzag scan order are respectively 0, 1, 2, 5, 0, 0, 10, and 13.

The position information output from the decoder 9108 is input to the entropy encoder 9110. The divider 9101 sequentially quantizes coefficients output from the block memory 9103 using corresponding quantization threshold values output from the quantization threshold value table 9102, and outputs results to the entropy encoder 9110. The entropy encoder 9110 sequentially executes entropy encoding on the basis of the outputs from the divider 9109 and decoder 9108.

Figure 10:
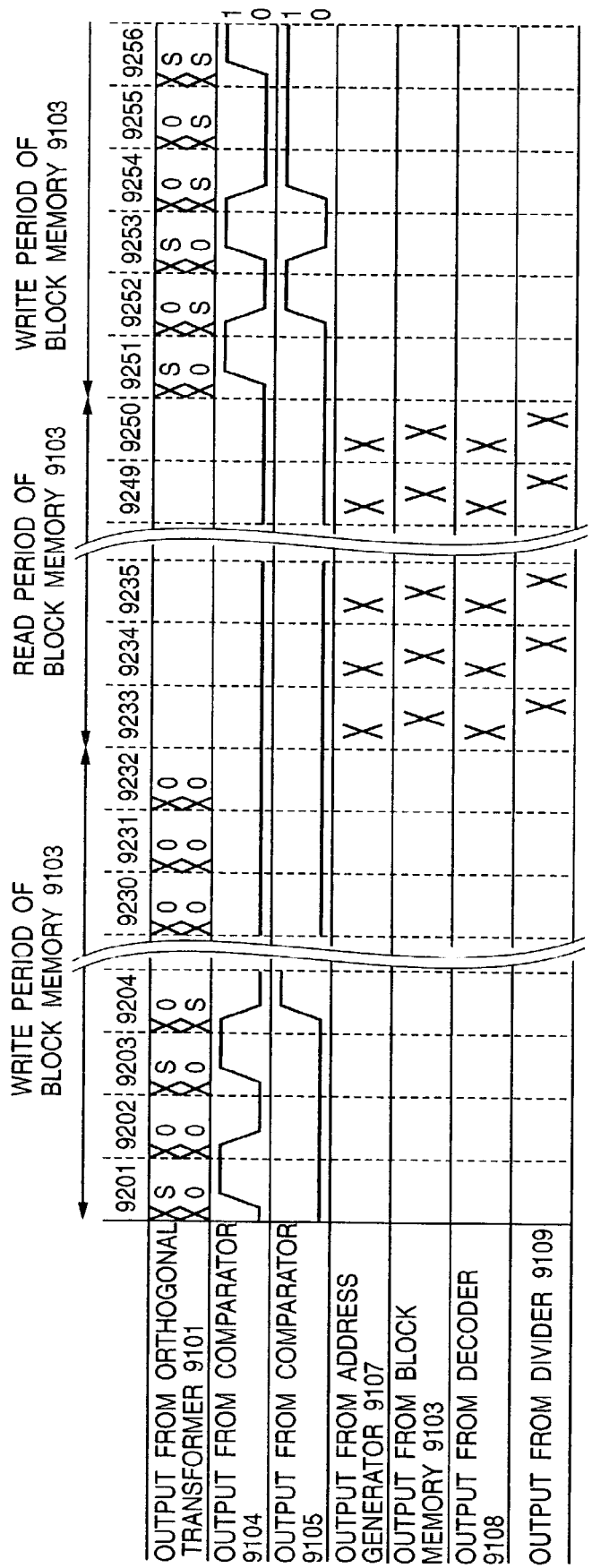
FIG. 10 is a timing chart showing the operations in respective units of the encoding apparatus according to the second embodiment of the present invention.

The operation of the encoding apparatus in this embodiment will be described below. FIG. 10 is a timing chart showing the operations of the respective units of the encoding apparatus in this embodiment. Note that "S" in FIG. 10 indicates a significant coefficient, and "0" indicates an insignificant coefficient.

In a period 9201, the orthogonal transformer 9101 begins to output orthogonal transform coefficients. If the quantization results of two coefficients output from the orthogonal transformer 9101 in the period 9201 are respectively significant and insignificant coefficients, the comparator 9104 outputs 1 and the comparator 9105 outputs 0 in the period 9201. In this embodiment, if it is determined that the quantization result is a significant coefficient, the checking result is 1; if it is determined that the quantization result is an insignificant coefficient, the checking result is 0. These checking results are input to and held by the checking result holding unit 9106. The two coefficients output from the orthogonal transformer 9101 in the period 9201 are written in the block memory 9103.

In a period 9202, the next two coefficients are output from the orthogonal transformer 9101. If the quantization results of two coefficients output from the orthogonal transformer 9101 in the period 9202 are respectively insignificant and insignificant coefficients, both the comparators 9104 and 9105 output 0 in the period 9202. These checking results are input to and held by the checking result holding unit 9106. The two coefficients output from the orthogonal transformer 9102 in the period 9201 are written in the block memory 9103. Likewise, every two coefficients of those for one block are output from the orthogonal transformer 9101, and are sequentially written in the block memory 9103, while the comparators 9104 and 9105 check quantization results, and their checking results are output to and held by the checking result holding unit 9106.

Upon completion of a write period for one block in a period 9232, a read period from the block memory 9103 starts from a period 9233. In the period 9233, the address generator 9107 generates read addresses for the block memory 9103 on the basis of the checking results for one block held in the checking result holding unit 9106. The read addresses are those of the block memory 9103 where the DC component and significant coefficients other than the DC component are stored in the zigzag scan order. Hence, one coefficient stored at one of the read addresses is read out from the block memory 9103 with reference to the read addresses generated by the address generator 9107.

In the period 9233, the decoder 9108 outputs position information of a corresponding coefficient in a unit block on the basis of the checking results in the checking result holding unit 9106. In the period 9233, the divider 9109 quantizes the coefficient output from the block memory 9103 using a corresponding quantization threshold value output from the quantization threshold value table 9102, and outputs the quantization result. The entropy encoder 9110 executes encoding on the basis of the outputs from the decoder 9108 and divider 9109. Likewise, address generation, read access, generation of intra-block position information, division, and entropy encoding are done until the process of the last significant coefficient in the unit block is completed.

Upon completion of the process of the last significant coefficient in the first block in a period 9250, the process of the next block starts in a period 9251. That is, the orthogonal transformer 9101 outputs first two coefficients of the next block in the period 9251.

Likewise, the processes are repeated for respective blocks of orthogonal transformation. Note that the number of times of read access from the block memory per block is given by:

1 (the number of DC components)+the number of significant coefficients other than the DC component in the unit block of interest That is, since only significant coefficients (except for the DC component) can be input to the divider, the divider can be used very efficiently, and the quantization process can be done faster than the conventional process.

[Third Embodiment]

Figure 11:
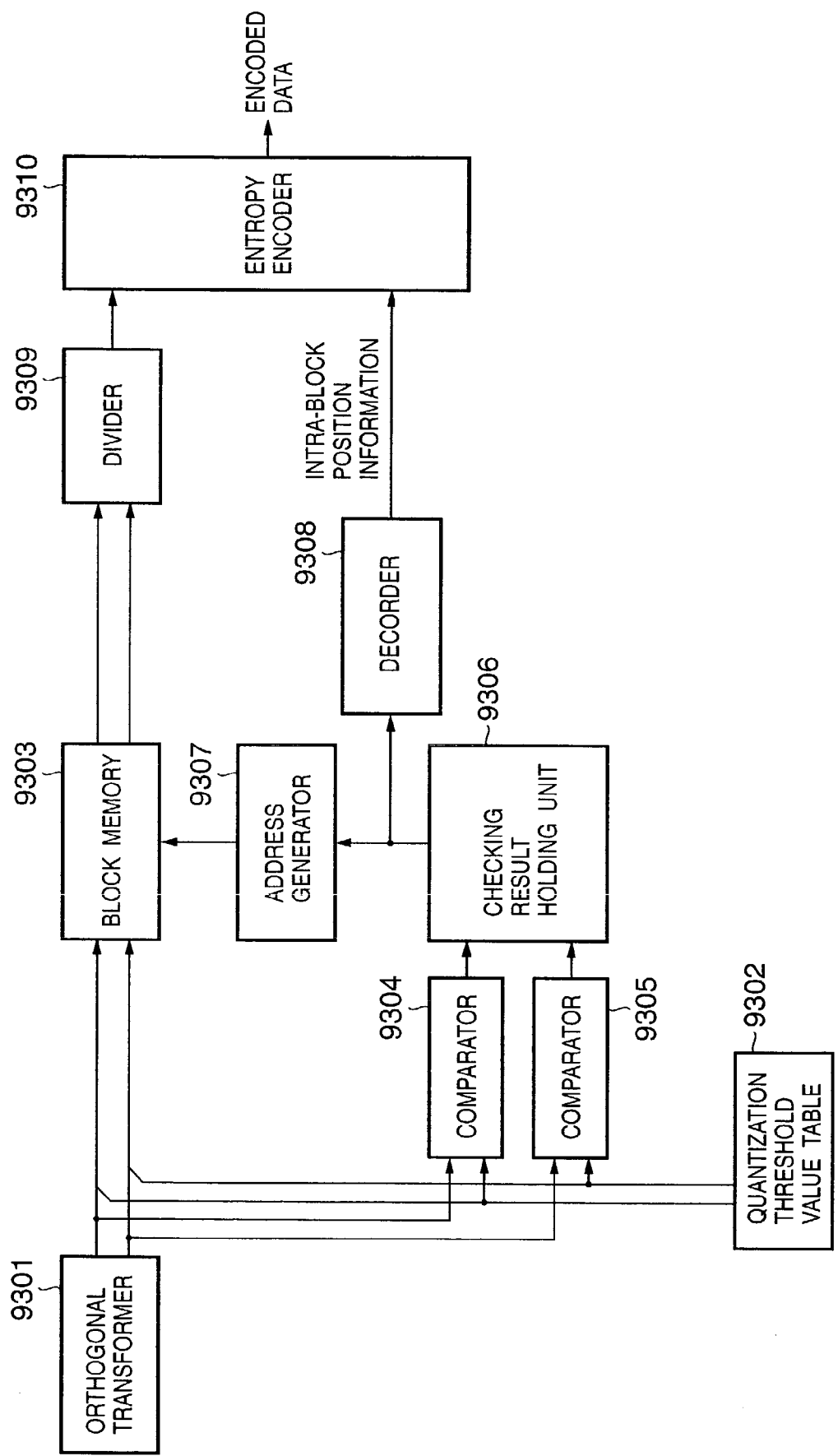
FIG. 11 is a block diagram showing the arrangement of an encoding apparatus according to the third embodiment of the present invention.

In this embodiment, an encoding process in an encoding apparatus that comprises the arrangement different from that in the second embodiment will be explained. FIG. 11 shows the arrangement of an encoding apparatus in this embodiment. The difference between the encoding apparatuses shown in FIGS. 11 and 9 is that a quantization threshold value read out from a quantization threshold value table 9302 is output to a block memory 9303. In this embodiment as well, as orthogonal transformation to be executed by an orthogonal transformer 9301, for example, DCT (discrete cosine transformation) or the like may be used and, in such case, the 2D DCT transformation device according to the first embodiment may be used as the orthogonal transformer 9301.

Figure 12:
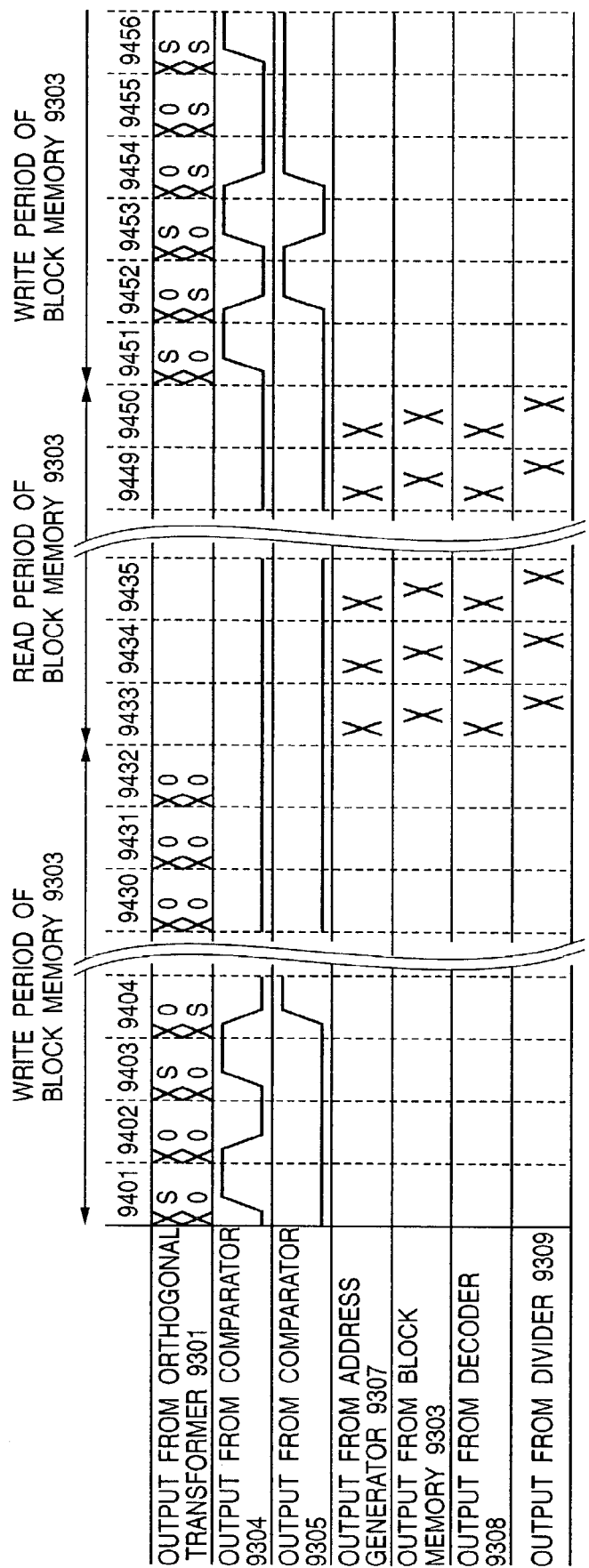
FIG. 12 is a timing chart showing the operations in respective units of the encoding apparatus according to the third embodiment of the present invention.
Figure 16:
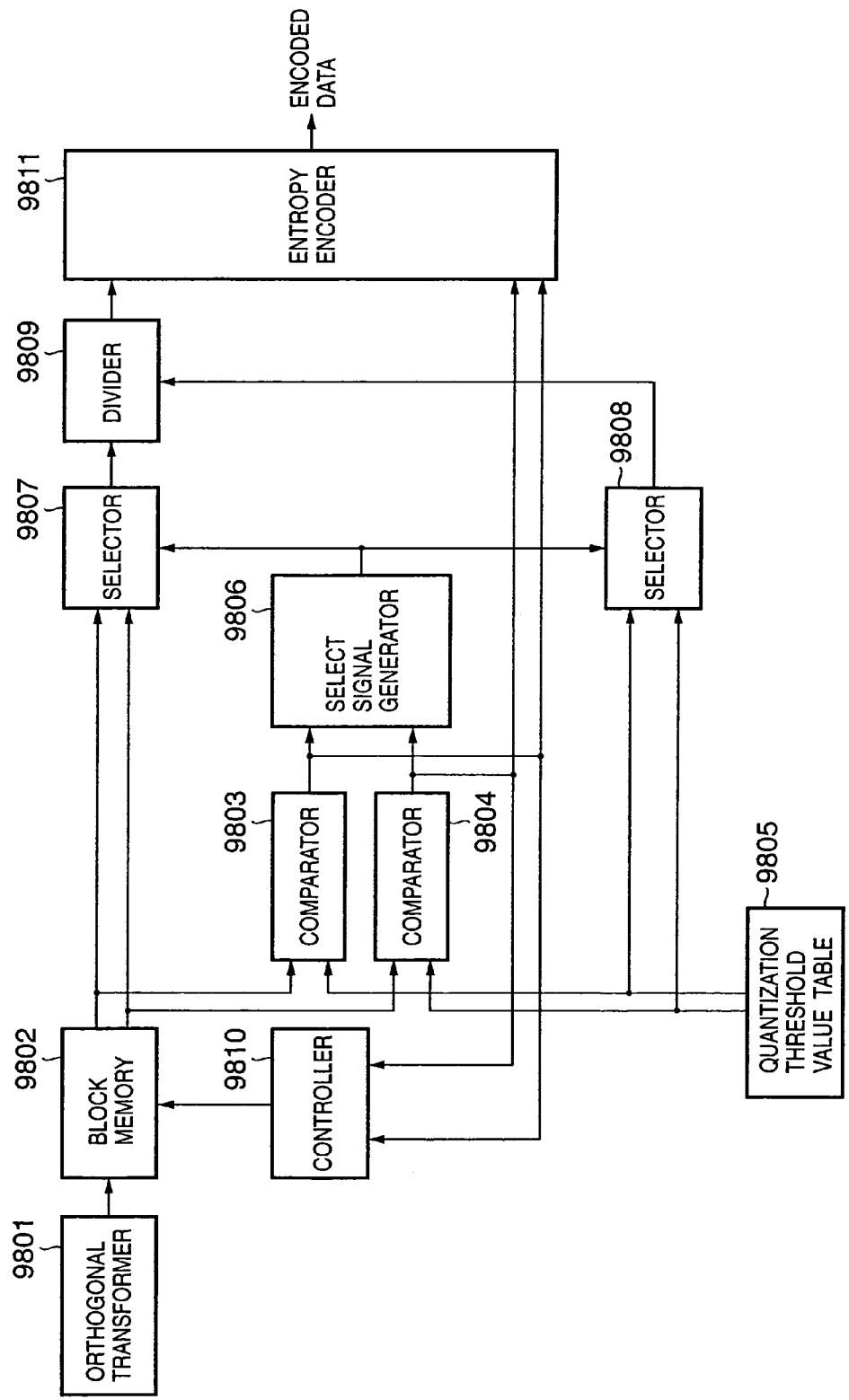
FIG. 16 is a block diagram showing the arrangement of a conventional encoding apparatus.
Figure 17:
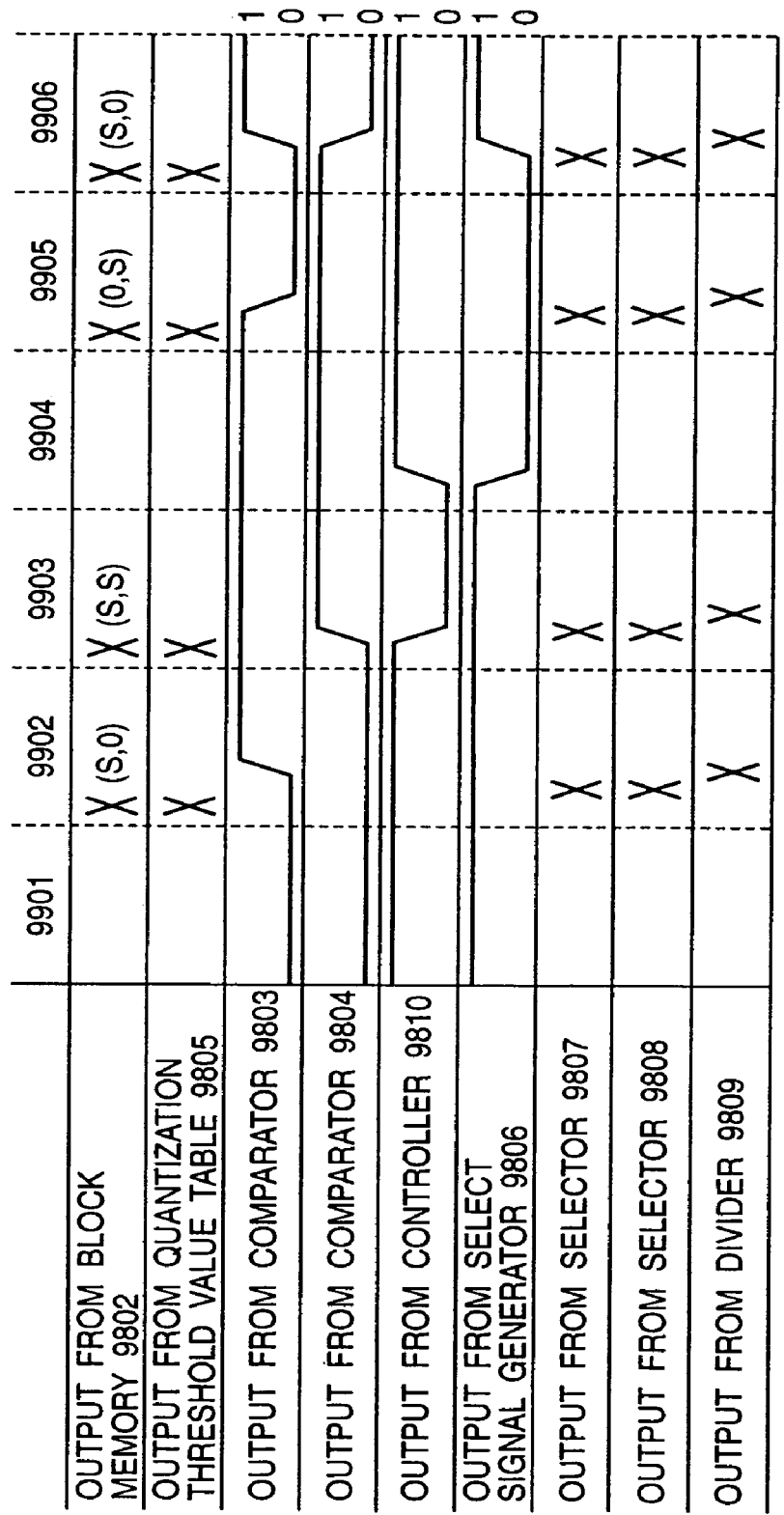
FIG. 17 is a timing chart showing the operations in the respective units of the conventional encoding apparatus.

FIG. 12 is a timing chart showing the operations in respective units shown in FIG. 11. Note that "S" in FIG. 12 indicates a significant coefficient, and "0" indicates an insignificant coefficient.

In a period 9401, the orthogonal transformer 9301 begins to output orthogonal transform coefficients. If the quantization results of two coefficients output from the orthogonal transformer 9301 in the period 9401 are respectively significant and insignificant coefficients, a comparator 9304 outputs 1 and a comparator 9305 outputs 0 in the period 9401. In this embodiment as well, if it is determined that the quantization result is a significant coefficient, the checking result is 1; if it is determined that the quantization result is an insignificant coefficient, the checking result is 0, as in the second embodiment. These checking results are input to and held by a checking result holding unit 9306. The two coefficients output from the orthogonal transformer 9301 in the period 9401 are written in the block memory 9303 together with corresponding two quantization threshold values read out from the quantization threshold value table 9302.

In a period 9402, the next two coefficients are output from the orthogonal transformer 9301. If the quantization results of two coefficients output from the orthogonal transformer 9301 in the period 9402 are respectively insignificant and insignificant coefficients, both the comparators 9304 and 9305 output 0 in the period 9402. These checking results are input to and held by the checking result holding unit 9306. The two coefficients output from the orthogonal transformer 9302 in the period 9401 are written in the block memory 9303 together with corresponding two quantization threshold values read out from the quantization threshold value table 9302.

Likewise, every two coefficients of those for one block are output from the orthogonal transformer 9301, and are sequentially written in the block memory 9303 together with corresponding quantization threshold values read out from the quantization threshold value table 9302. Meanwhile, the comparators 9304 and 9305 check quantization results, and their checking results are output to and held by the checking result holding unit 9306.

Upon completion of a write period for one block in a period 9432, a read period starts from a period 9433. In the period 9433, the address generator 9307 generates read addresses for the block memory 9303 on the basis of the checking results for one block held in the checking result holding unit 9306. The read addresses are those of the block memory 9303 where the DC component and significant coefficients other than the DC component are stored in the zigzag scan order.

Also, in the period 9433, a pair of quantization threshold values corresponding to the coefficients stored at addresses output from the address generator 9307 are read out from the block memory 9303. Furthermore, in the period 9433, the decoder 9308 outputs position information of a corresponding coefficient in a unit block on the basis of the checking results in the checking result holding unit 9306. In the period 9433, the divider 9309 quantizes the coefficient output from the block memory 9303 using a corresponding quantization threshold value, and outputs the quantization result. The entropy encoder 9310 executes encoding on the basis of the outputs from the decoder 9308 and divider 9309. Likewise, address generation, read access, generation of intra-block position information, division, and entropy encoding are done until the process of the last significant coefficient in the unit block is completed.

Upon completion of the process of the last significant coefficient in the first block in a period 9450, the process of the next block starts in a period 9451. That is, the orthogonal transformer 9301 outputs first two coefficients of the next block in the period 9451.

According to this embodiment, since the quantization threshold values are read out only once from the quantization threshold value table 9302 (only read access by the comparators 9304 and 9305), the entire encoding process can be done faster than the second embodiment (twice, i.e., read access by the comparators 9104 and 9105, and read access by the divider 9109).

According to the second and third embodiments described above, the encoding process can be speeded up without increasing the number of dividers that require a large circuit scale. For example, comparison between the numbers of processing cycles required for the conventional encoding apparatus and the encoding apparatus in the second or third embodiment will be explained using FIGS. 14 and 15.

Figure 15:
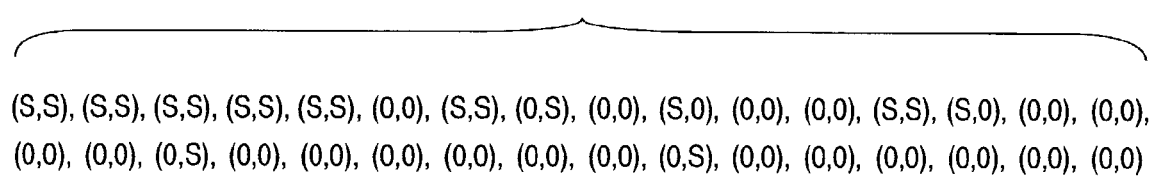

FIG. 15 shows a state wherein every two coefficients line up in the zigzag scan order in the example shown in FIG. 14.

The number of processing cycles required for the conventional encoding apparatus will be examined first (the number of write cycles in the block memory will be omitted). Note that "S" indicates a significant coefficient, and "0" indicates an insignificant coefficient. Of pairs of coefficients simultaneously input to the checking result holding unit, the number of (S, S) is 7, the number of (S, 0) or (0, S) is 5, and the number of (0, 0) is 20. Hence, the number of processing cycles is given by:

7×2+5+20=39 cycles

On the other hand, in the encoding apparatus in the second or third embodiment, since the number of significant coefficients other than the DC component is 18, the number of processing cycles is given by:

1+18=19 cycles

Hence, the encoding apparatus in the second or third embodiment can reduce the processing time by 20 cycles in the above example.

When a program that implements an encoding method of the encoding apparatus of the second or third embodiment is loaded by an information processing apparatus (e.g., a personal computer, workstation, or the like), this information processing apparatus can serve as the aforementioned encoding apparatus. Hence, the program that implements the encoding method is included in the scope of the present invention. Also, the same applies to a storage medium (e.g., a CD-ROM, DVD-ROM, and the like) that stores the program and is used to load the program onto the information processing apparatus.

The encoding apparatus (quantization device) according to the second or third embodiment and that (2D DCT transformation device) according to the first embodiment may be combined into a single apparatus (to be referred anew to as an encoding apparatus). In such case, in this encoding apparatus, the quantization device quantizes a group of transform coefficients as the output results of the 2D DCT transformation device, and entropy-encodes the quantization results. As described above, since the 2D DCT transformation device and quantization device can respectively execute processes faster than the conventional apparatus, this encoding apparatus can execute an encoding process faster than the conventional encoding apparatus.

[Fourth Embodiment]

In this embodiment, a dequantization device for executing a dequantization process in a decoding apparatus for decoding encoded data will be explained. Note that this embodiment will exemplify a case wherein quantized data, which is obtained by quantizing data having a domain from 0 to 1024 using a quantization threshold value having a domain from 1 to 255, is dequantized to data having the domain from 0 to 1024.

FIG. 19 is a table showing maximum values of quantized data, whose products corresponding to values of quantization threshold values do not exceed 1024, corresponding numbers of bits, and means used in dequantization. As can be seen from FIG. 19, when the quantization threshold value falls within the range from 5 to 16, a dequantized value can be obtained by a multiplier having a size specified by (the number of bits that can express the quantization threshold values 5 to 16)×(1024/(5 to 16), i.e., 5 bits×8 bits; when the quantization threshold value falls within the range from 17 to 64, a dequantized value can be obtained by a multiplier having a size of 7 bits×6 bits; and when the quantization threshold value falls within the range from 65 to 255, a dequantized value can be obtained by a multiplier having a size of 8 bits×4 bits. Hence, when the quantization threshold value falls within the range from 5 to 255, a dequantized value can be obtained by a multiplier having a size of 6 bits×8 bits at most.

If the quantization threshold value is 1, quantized data is directly output as a dequantized value without using any multiplier. On the other hand, if the quantization threshold value is 2 or 4, since a dequantized value can be obtained by multiplying quantized data by 2 or 4, the quantized data is shifted one or two bits to the MSB. That is, a coefficient unit for attaining such bit shift is used. On the other hand, if the quantization threshold value is 3, since a dequantized value can be obtained by multiplying quantized data by 3, the sum of the value of the quantized data and its double value is calculated. That is, the aforementioned coefficient unit (a coefficient unit for shifting quantized data one bit to the MSB (multiplying quantized data by 2)) and an adder that adds the output from this coefficient unit and the quantized data are used.

Figure 18:
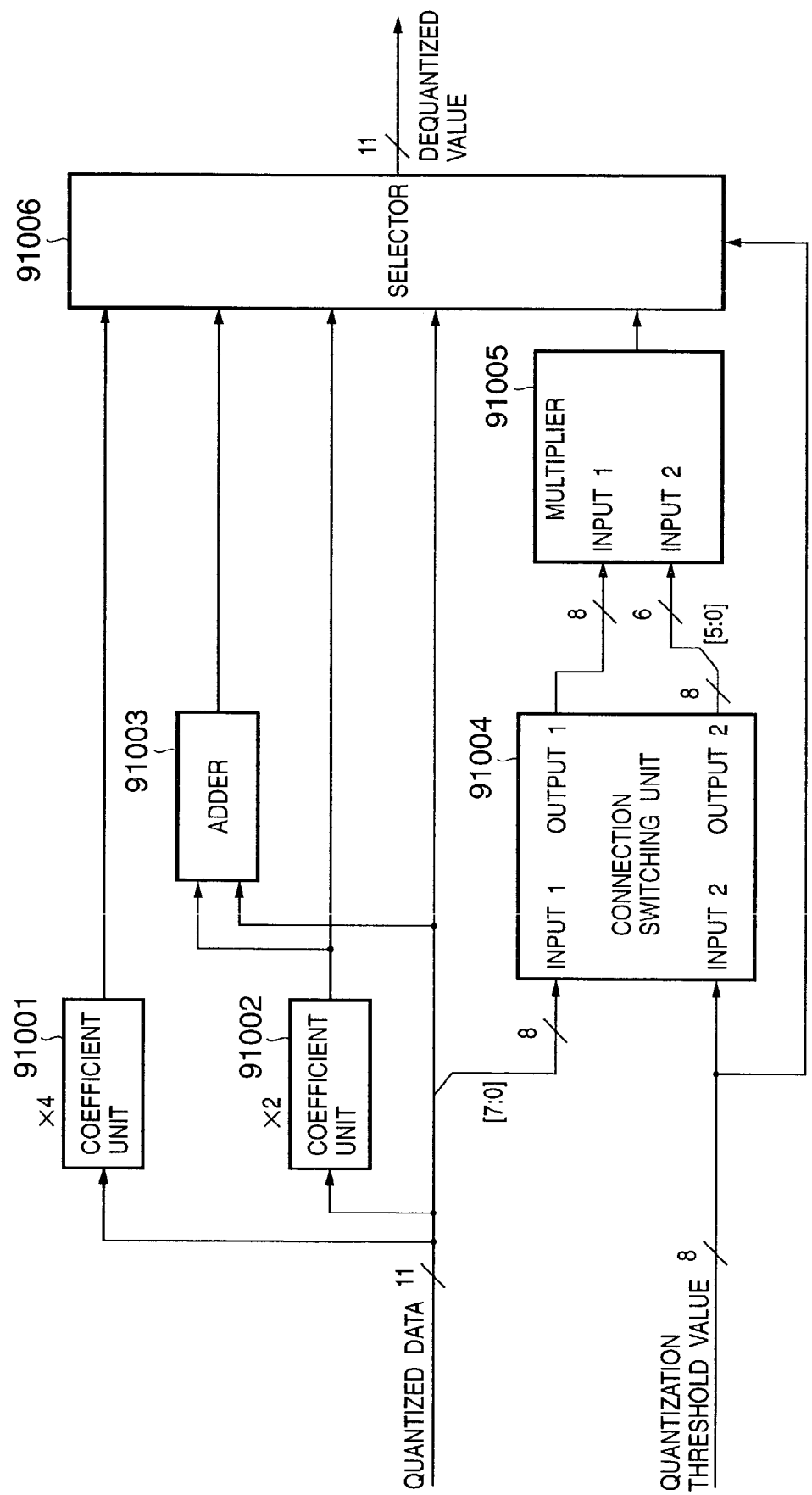
FIG. 18 is a block diagram showing the arrangement of a dequantization device in the fourth embodiment of the present invention.

FIG. 18 shows the arrangement of the dequantization device in this embodiment. Referring to FIG. 18, reference numeral 91001 denotes a coefficient unit which receives quantized data, and outputs a quadruple value of the quantized value data as an output. In practice, since this coefficient unit 91001 is constituted by wiring connections that implement 2-bit shift to the MSB, no circuit element is required. Reference numeral 91002 denotes a coefficient unit which receives quantized data, and outputs a double value of the quantized value data as an output. In practice, since this coefficient unit 91002 is constituted by wiring connections that implement 1-bit shift to the MSB, no circuit element is required. Reference numeral 91003 denotes an adder, which outputs the sum of quantized data and the output from the coefficient unit 91002. That is, the output from the adder 91003 is equivalent to a triple value of quantized data. The lower 8 bits of quantized data are input to input 1 of a connection switching unit 91004, and the quantization threshold value is input to input 2 of the connection switching unit 91004.

The connection switching unit 91004 outputs the value of input 1 to output 2, and the value of input 2 to output 1 when the quantization threshold value falls within the range from 17 to 255; it outputs the value of input 1 to output 1 and the value of input 2 to output 2 when the quantization threshold value falls outside the above range. Reference numeral 91005 denotes a multiplier having a size of 8 bits×6 bits. The multiplier 91005 has 8-bit input 1 and 6-bit input 2, and outputs the product of these two inputs. The output from output 1 of the connection switching unit 91004 is input to input 1 of the multiplier 91005, and the lower 6 bits of the output from output 2 of the connection switching unit 91004 are input to input 2 of the multiplier 91005.

The outputs from the coefficient unit 91001, adder 91003, coefficient unit 91002, and multiplier 91005, and quantized data are input to a selector 91006, which selects and outputs only one of these five inputs in accordance with a quantization threshold value. The selector 91006 selects quantized data when the quantization threshold value=1; the output from the coefficient unit 91002 when the quantization threshold value=2; the output from the adder 91003 when the quantization threshold value=3; the output from the coefficient unit 91001 when the quantization threshold value=4; and the output from the multiplier 91005 when the quantization threshold value assumes a value other than the aforementioned values, as described above. In this way, the output from the selector 91006 corresponds to a dequantized value to be obtained.

The operation of the dequantization device with the above arrangement will be explained below using some examples. A case will be explained first wherein the quantization threshold value is 1, and quantized data is 895. Since the selector 91006 selects and outputs the value (i.e., 895) of the quantized data when the quantization threshold value is 1, a value "895" is obtained as a dequantized value.

A case will be explained below wherein the quantization threshold value is 2, and quantized data is 512. The quantized data is doubled by the coefficient unit 91002, and a value "1024" is output to the selector 91006. When the quantization threshold value is 2, since the selector 91006 selects and outputs the output from the coefficient unit 91002, a value "1024" is obtained as a dequantized value.

A case will be explained below wherein the quantization threshold value is 3, and quantized data is 198. The quantized data is doubled by the coefficient unit 91002, and a value "396" is output to the adder 91003. On the other hand, quantized data with the value "198" is input to the other input of the adder 91003. The adder 91003 adds 396 and 198 and outputs a value "594". When the quantization threshold value is 3, since the selector 91006 selects and outputs the output from the adder 91003, a value "594" is obtained as a dequantized value.

A case will be explained below wherein the quantization threshold value is 4, and quantized data is 253. The quantized data is multiplied by 4 by the coefficient unit 91001, and a value "1012" is output to the selector 91006. When the quantization threshold value is 4, since the selector 91006 selects and outputs the output from the coefficient unit 91001, a value "1012" is obtained as a dequantized value.

A case will be explained below wherein a quantization threshold value is 13, and quantized data is 68. The lower 8 bits of the quantized data (i.e., a value "68") are input to input 1 of the connection switching unit 91004. Also, the quantization threshold value (i.e., a value "13") is input to input 2 of the connection switching unit 91004. Since the quantization threshold value is "13", it falls outside the range from 17 to 255, as described above. Therefore, the connection switching unit 91004 outputs the value (i.e., 68) of input 1 to output 1, and the value (i.e., 13) of input 2 to output 2, respectively. Hence, the value (i.e., 68) of output 1 of the connection switching unit 91004 is input to the multiplier 91005, and the value (i.e., 13) of the lower 6 bits of output 2 of the connection switching unit 91004 is input to the multiplier 91005. Therefore, the multiplier 91005 outputs 68×13=884 as its output value. Since the quantization threshold value corresponds to none of 1, 2, 3, and 4, the selector 91006 selects and outputs the output from the multiplier 91006. Hence, a value "884" is obtained as a dequantized value.

A case will be explained below wherein the quantization threshold value is 86, and quantized data is 9. The lower 8 bits of the quantized data (i.e., a value "9") are input to input 1 of the connection switching unit 91004. Also, the quantization threshold value (i.e., a value "86") is input to input 2 of the connection switching unit 91004. Since the quantization threshold value is "86", it falls within the range from 17 to 255, as described above. Therefore, the connection switching unit 91004 outputs the value (i.e., 9) of input 1 to output 2, and the value (i.e., 86) of input 2 to output 1, respectively. Hence, the value (i.e., 86) of output 1 of the connection switching unit 91004 is input to the multiplier 91005, and the value (i.e., 9) of the lower 6 bits of output 2 of the connection switching unit 91004 is input to the multiplier 91005. Therefore, the multiplier 91005 outputs 86×9=774 as its output value. Since the quantization threshold value corresponds to none of 1, 2, 3, and 4, the selector 91006 selects and outputs the output from the multiplier 91006. Hence, a value "774" is obtained as a dequantized value. The same processes are done for other values, and dequantized values are output.

In this way, a system in which it is guaranteed that the dequantization result of a quantization threshold value and quantized data does not exceed an original domain (1024 in this embodiment) preferably uses the dequantization device with the arrangement of this embodiment.

This is because when it is guaranteed that the dequantization result of a quantization threshold value and quantized data does not exceed the original domain, the quantized data and quantization threshold value according to this original domain are used.

According to this embodiment, a dequantization device can be implemented by reducing the bit size of a multiplier with a large circuit scale. According to the dequantization device of this embodiment, since the multiplier with the size of 8 bits×6 bits, adder, and some logic need only be used in place of the multiplier with the size of 8 bits×11 bits in the conventional device, the circuit scale can be greatly reduced. Also, a high execution speed can be assured.

[Fifth Embodiment]

Figure 20:
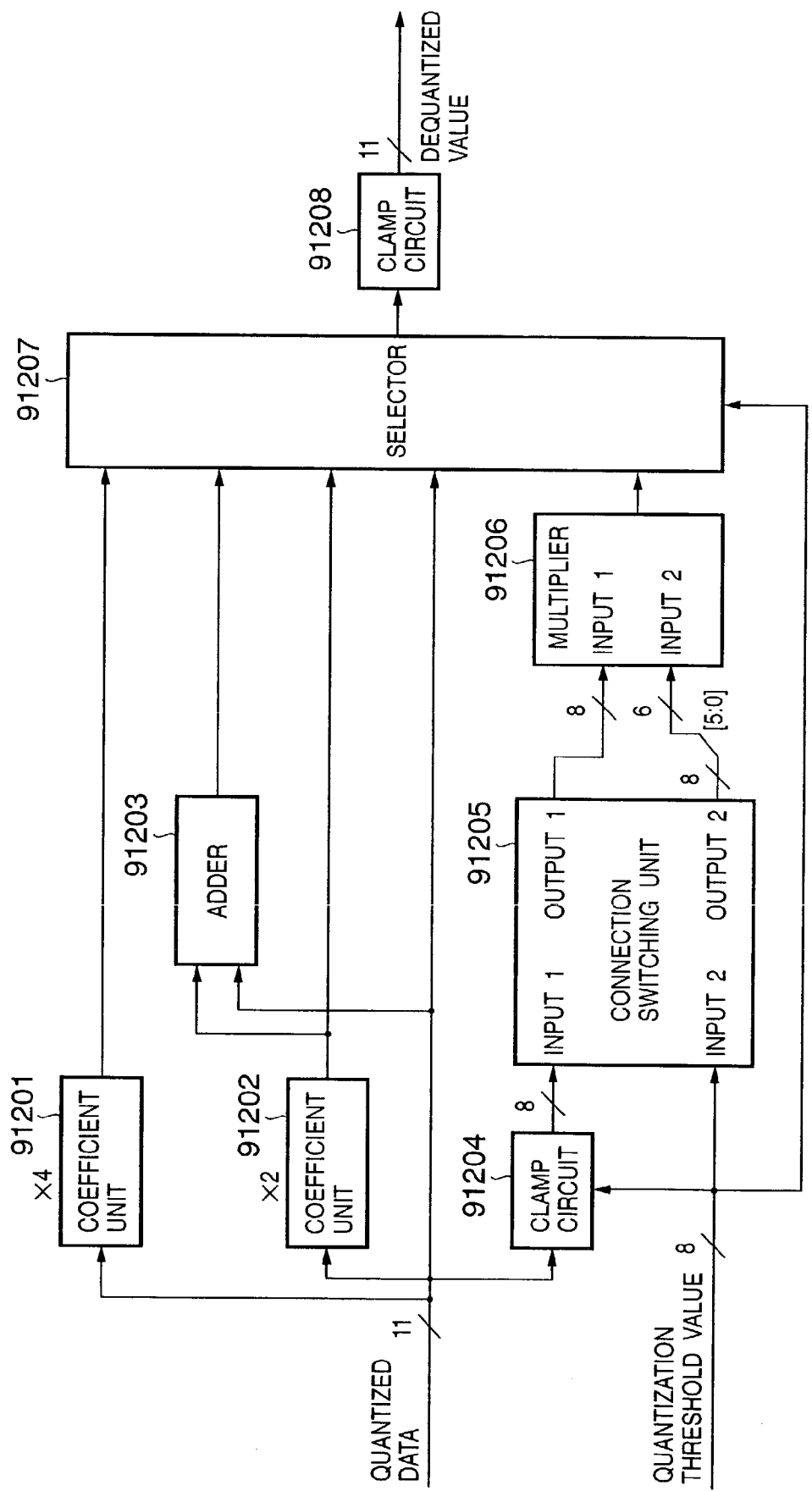
FIG. 20 is a block diagram showing the arrangement of a dequantization device in the fifth embodiment of the present invention.
Figure 21:
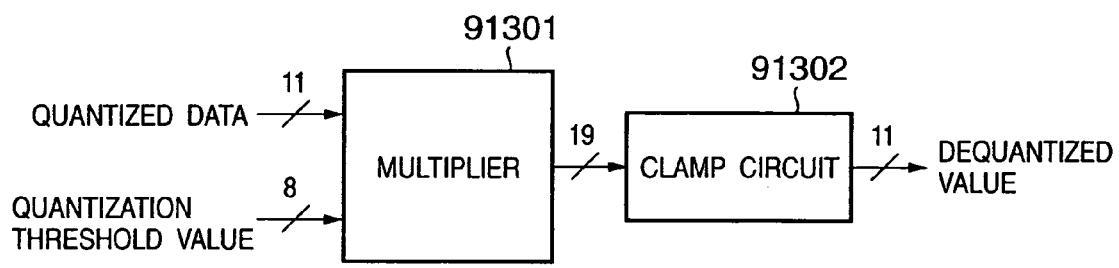
FIG. 21 is a block diagram showing the arrangement of a conventional dequantization device.

This embodiment will explain a dequantization device which has an arrangement and executes processes, which are different from those of the dequantization device described in the fourth embodiment. FIG. 20 shows the arrangement of a dequantization device in this embodiment.

Reference numeral 91201 denotes a coefficient unit which receives quantized data, and outputs its quadruple value. In practice, since this coefficient unit 91201 is constituted by wiring connections that implement 2-bit shift to the MSB, no circuit element is required. Reference numeral 91202 denotes a coefficient unit which receives quantized data, and outputs its double value. In practice, since this coefficient unit 91202 is constituted by wiring connections that implement 1-bit shift to the MSB, no circuit element is required. Reference numeral 91203 denotes an adder, which outputs the sum of quantized data and the output from the coefficient unit 91202. That is, the output from the adder 91203 is equivalent to a triple value of quantized data. Also, quantized data is input to a clamp circuit 91204.

When the quantization threshold value falls within the range from 17 to 255, the clamp circuit 91204 outputs 63 (corrects quantized data) when input quantized data exceeds 63, or directly outputs input quantized data when the input quantized data does not exceed 63. On the other hand, when the quantization threshold value falls outside the range from 17 to 255, the clamp circuit outputs 255 when input quantized data exceeds 255, or directly outputs input quantized data when the input quantized data does not exceed 255. The output from the clamp circuit 91204 is input to input 1 of a connection switching unit 91205, and the quantization threshold value is input to input 2 of the connection switching unit 91205.

The connection switching unit 91205 outputs a value of input 1 to output 2, and a value of input 2 to output 1 when the quantization threshold value falls within the range from 17 to 255; it outputs a value of input 1 to output 1 and a value of input 2 to output 2 when the quantization threshold value falls outside the above range. Reference numeral 91206 denotes a multiplier having a size of 8 bits×6 bits. The multiplier 91206 has 8-bit input 1 and 6-bit input 2, and outputs the product of these two inputs. The output from output 1 of the connection switching unit 91205 is input to input 1 of the multiplier 91206, and the lower 6 bits of the output from output 2 of the connection switching unit 91205 are input to input 2 of the multiplier 91206. The outputs from the coefficient unit 91201, adder 91203, coefficient unit 91202, and multiplier 91206, and quantized data are input to a selector 91207, which selects and outputs only one of these five inputs in accordance with the quantization threshold value.

The selector 91207 selects quantized data when the quantization threshold value=1; the output from the coefficient unit 91202 when the quantization threshold value=2; the output from the adder 91203 when the quantization threshold value=3; the output from the coefficient unit 91201 when the quantization threshold value=4; and the output from the multiplier 91206 when the quantization threshold value assumes a value other than the aforementioned values, as described above. The output from the selector 91207 is input to a clamp circuit 91208, which outputs 1024 when the output value of the selector 91207 exceeds 1024, or directly outputs the output value of the selector 91207 when it does not exceed 1024. The output from the clamp circuit 91208 corresponds to a dequantized value to be obtained.

The operation of the dequantization device with the above arrangement will be explained below using some examples.

A case will be explained first wherein the quantization threshold value is 1, and quantized data is 895. Since the selector 91207 selects and outputs the value (i.e., 895) of the quantized data when the quantization threshold value is 1, a value "895" is input to the clamp circuit 91208. Since the value "895" is not more than 1024, the clamp circuit 91208 directly outputs that input. Hence, the value "985" is obtained as a dequantized value.

A case will be explained below wherein the quantization threshold value is 2, and quantized data is 513. The quantized data is doubled by the coefficient unit 91202, and a value "1026" is output to the selector 91207. When the quantization threshold value is 2, since the selector 91207 selects and outputs the output from the coefficient unit 91202, a value "1026" is input to the clamp circuit 91208. Since the value "1026" is larger than 1024, the clamp circuit 91208 outputs 1024 as a value. Hence, a value "1024" is obtained as a dequantized value.

A case will be explained below wherein the quantization threshold value is 3, and quantized data is 198. The quantized data is doubled by the coefficient unit 91202, and a value "396" is output to the adder 91203. On the other hand, quantized data with the value "198" is input to the other input of the adder 91203. The adder 91203 adds 396 and 198 and outputs a value "594". When the quantization threshold value is 3, since the selector 91207 selects and outputs the output from the adder 91203, a value "594" is input to the clamp circuit 91208. Since the value "594" is not more than 1024, the clamp circuit 91208 directly outputs that input. Hence, the value "594" is obtained as a dequantized value.

A case will be explained below wherein the quantization threshold value is 4, and quantized data is 253. The quantized data is multiplied by 4 by the coefficient unit 91201, and a value "1012" is output to the selector 91207. When the quantization threshold value is 4, since the selector 91207 selects and outputs the output from the coefficient unit 91201, a value "1012" is input to the clamp circuit 91208. Since the value "1012" is not more than 1024, the clamp circuit 91208 directly outputs that input. Hence, the value "1012" is obtained as a dequantized value.

A case will be explained below wherein the quantization threshold value is 14, and quantized data is 73. The quantized data with a value "73" is input to the clamp circuit 91204. Also, the quantization threshold value with a value "14" is input to the clamp circuit 91204. Since the quantization threshold value falls outside the range from 17 to 255, and the quantized data is not more than 255, the clamp circuit 91204 directly outputs the value (i.e., 73) of the quantized data. The output from the clamp circuit 91204, i.e., the value "73" is input to input 1 of the connection switching unit 91205. Also, the quantization threshold value "14" is input to input 2 of the connection switching unit 91205. Since the quantization threshold value is 14, it falls outside the range from 17 to 255. Hence, the connection switching unit 91205 outputs the value (i.e., 73) of input 1 to output 1, and the value (i.e., 14) of input 2 to output 2, respectively. The value (i.e., 73) of output 1 of the connection switching unit 91205 is input to the multiplier 91206, and the lower 6-bit value (i.e., 14) of the output 2 of the connection switching unit 91205 is input to the multiplier 91206. Hence, the multiplier 91206 outputs 73×14=1022 as its output value.

Since the quantization threshold value corresponds to none of 1, 2, 3, and 4, the selector 91207 selects and outputs the output from the multiplier 91206. As a result, the value "1022" is input to the clamp circuit 91208. Since the value "1022" is not more than 1024, the clamp circuit 91208 directly outputs that input. Hence, the value "1022" is obtained as a dequantized value.

A case will be explained below wherein the quantization threshold value is 65, and quantized data is 66. The quantized data with a value "66" is input to the clamp circuit 91204. Also, the quantization threshold value with a value "65" is input to the clamp circuit 91204. Since the quantization threshold value falls within the range from 17 to 255, and the quantized data is larger than 63, the clamp circuit 91204 outputs 63. The output from the clamp circuit 91204, i.e., the value "63" is input to input 1 of the connection switching device 91205. Also, the quantization threshold value "65" is input to input 2 of the connection switching device 91205. Since the quantization threshold value is 65, it falls within the range from 17 to 255. Therefore, the connection switching device 91205 outputs the value (i.e., 63) of input 1 to output 2, and the value (i.e., 65) of input 2 to output 1, respectively. The value (i.e., 65) of output 1 of the connection switching device 91205 is input to input 1 of the multiplier 91206, and the lower 6-bit value (i.e., 63) of output 2 of the connection switching device 91205 is input to output 2 of the multiplier 91206. Then, the multiplier 91206 outputs 65×63=4095 as its output value.

Since the quantization threshold value corresponds to none of 1, 2, 3, and 4, the selector 91207 selects and outputs the output from the multiplier 91206. As a result, the value "4095" is input to the clamp circuit 91208. Since the value "4095" is larger than 1024, the clamp circuit 91208 outputs a value "1024". Hence, the value "1024" is obtained as a dequantized value. The same processes are done for other values, and dequantized values are output.

When a program that implements a dequantization method of the dequantization device of the fourth or fifth embodiment is loaded by an information processing apparatus (e.g., a personal computer, workstation, or the like), this information processing apparatus can serve as the aforementioned dequantization device. Hence, the program that implements the dequantization method is included in the scope of the present invention. Also, the same applies to a storage medium (e.g., a CD-ROM, DVD-ROM, and the like) that stores the program and is used to load the program onto the information processing apparatus.

[Other Embodiments]

Furthermore, the invention is not limited only to the device and method for realizing the embodiments above, but a case also falls within the scope of the invention where a program code for software to realize the embodiments above is provided to a computer (CPU or MPU) in a system or device, and the computer of the system or device causes the various devices to operate in accordance with the program code so that the embodiments can be realized.

In this case, the program code itself for software will realize the features of the embodiments, thus the program code itself and the means for supplying the code to a computer, specifically, a storage medium with the program code stored on it, are included within the scope of the invention.

The storage medium for storing such a program code may include floppy® disk, hard disk, optical disk, magneto-optical disk, CD-ROM, magnetic tape, non-volatile memory card, ROM and so on.

In addition, such a program code is included within the scope of the invention not only in the case where a computer controls various devices only in accordance with supplied program code to realize the features of the embodiments, but also in the case where the program code realizes the embodiments in conjunction with an OS (operating system) or other application software running on a computer.

Also, a case is included within the scope of the invention where after the supplied program code has been stored in memory provided on a feature expansion board of a computer or a feature expansion unit connected to a computer, the CPU or the like on the feature expansion board or unit executes some or all of the actual processing based on the designation of the code to realize the embodiments.

As described above, according to the present invention, even when a general synchronous RAM is used as a RAM used in transposition conversion, high-speed 2D orthogonal transformation can be achieved.

Also, according to the present invention, a higher-speed quantization process can be done with a smaller circuit scale. Also, when a maximum value of dequantized data is set, quantized data can be dequantized at a higher speed with a smaller circuit scale.

The present invention is not limited to the above embodiments and various changes and modifications can be made within the sprit and scope of the present invention. Therefore, to apprise the public of the scope of the present invention the following claims are made.

What is claimed is:

1. An image processing apparatus for receiving every n data of image data which has been segmented into rectangular blocks each consisting of n×n data, and applying two-dimensional orthogonal transforms to the received data, comprising:
one-dimensional orthogonal transformation means for applying one-dimensional orthogonal transforms to the n inputs, and outputting n coefficients;
transposition conversion means for transposing n×n coefficients output from said one-dimensional orthogonal transformation means, and outputting every n coefficients;
first selection means for selecting either a predetermined number m (0<m<n) of coefficients of the n coefficients output from said transposition conversion means, or the predetermined number m (0<m<n) of coefficients of the n coefficients output from said one-dimensional orthogonal transformation means; and
second selection means for selecting either the n image data, or n data as a combination of the predetermined number m of coefficients selected by said first selection means and remaining (n−m) coefficients, which are not input to said first selection means, of the n coefficients output from said transposition conversion means, and supplying the selected data as n data to said one-dimensional orthogonal transformation means.

2. The apparatus according to claim 1, wherein the orthogonal transformation is a DCT transformation.

3. The apparatus according to claim 1, wherein the predetermined number m of the n coefficients output from said one-dimensional orthogonal transformation means designates the number of lowest-frequency component data of the n coefficients.

4. The apparatus according to claim 3, wherein the predetermined number m of the n coefficients output from said transposition conversion means designates the number of highest-frequency component data.

5. A program for making a computer function as an image processing apparatus of claim 1.

6. A storage medium storing a program of claim 5.

7. An image processing method for receiving every n data of image data which has been segmented into rectangular blocks each consisting of n×n data, and applying two-dimensional orthogonal transforms to the received data, comprising:
a one-dimensional orthogonal transformation step of applying one-dimensional orthogonal transforms to the n inputs, and outputting n coefficients;
a transposition conversion step of transposing n×n coefficients output in said one-dimensional orthogonal transformation step, and outputting every n coefficients;
a first selection step of selecting either a predetermined number m (0<m<n) of coefficients of the n coefficients output in said transposition conversion step, or the predetermined number m (0<m<n) of coefficients of the n coefficients output in said one-dimensional orthogonal transformation step; and
a second selection step of selecting either the n image data, or n data as a combination of the predetermined number m of coefficients selected in said first selection step and remaining (n−m) coefficients, which are not input to said first selection step, of the n coefficients output in said transposition conversion step, and supplying the selected data as n data to said one-dimensional orthogonal transformation step.

8. The method according to claim 7, wherein the orthogonal transformation is a DCT transformation.

9. The method according to claim 7, wherein the predetermined number m of the n coefficients output in said one-dimensional orthogonal transformation step designates the number of lowest-frequency component data of the n coefficients.

10. The method according to claim 9, wherein the predetermined number m of the n coefficients output in said transposition conversion step designates the number of highest-frequency component data.

11. An image processing apparatus for generating dequantized data by executing a dequantization process of quantized data, comprising:
bit-shift means for bit-shifting a quantized data, the quantized data and a quantization threshold value being such that a maximum value of the dequantized data is a predetermined value, to generate data indicating a quantized value corresponding to an even number multiple of the quantized data;
addition means for generating data indicating a quantized value corresponding to an odd number multiple of the quantized data by adding the quantized data and the data indicating the quantized value corresponding to the even number multiple of the quantized data, which is generated by said bit-shift means;
multiplication means for multiplying the quantized data and the quantization threshold value; and
selection means for selecting an operation result of one of said bit-shift means, addition means, and multiplication means, or the quantized data in accordance with the quantization threshold value, and outputting the selected data as the dequantized data.

12. The apparatus according to claim 11, wherein the quantization threshold value is given by p/q where p is a maximum value indicated by the dequantized value, and q is the quantized data.

13. The apparatus according to claim 11, wherein said selection means selects and outputs, as the dequantized value:
the quantized data when the quantization threshold value is 1;
the operation result of said bit-shift means when the quantization threshold value is 2 or 4;
the operation result of said addition means when the quantization threshold value is 3; or
the operation result of said multiplication means when the quantization threshold value is none of 1, 2, 3, and 4.

14. The apparatus according to claim 11, further comprising quantized data correction means for correcting quantized data, a maximum value of the dequantized data of which does not assume a predetermined value, in accordance with the quantization threshold value,
wherein the quantized data corrected by said quantized data correction means is input to said multiplication means.

15. The apparatus according to claim 14, wherein said quantized data correction means corrects a value q indicated by the quantized data to an integer smaller than p/r where p is the value of the dequantized data, q is the value of the quantized data, and r is the value of the quantization threshold value (for q×r>p).

16. The apparatus according to claim 11, further comprising dequantized value correction means for correcting a dequantized value, when the dequantized value selected by said selection means is not less than a predetermined value.

17. A program for making a computer function as an image processing apparatus of claim 11.

18. A storage medium storing a program of claim 17.

19. An image processing apparatus for receiving every n data of image data which has been segmented into rectangular blocks each consisting of n×n data, applying two-dimensional orthogonal transforms to the received data, and quantizing transform coefficients obtained by the two-dimensional orthogonal transformation, comprising:

one-dimensional orthogonal transformation means for applying one-dimensional orthogonal transforms to the n inputs, and outputting n coefficients;

transposition conversion means for transposing n×n coefficients output from said one-dimensional orthogonal transformation means, and outputting every n coefficients;

first selection means for selecting either a predetermined number m (0<m<n) of coefficients of the n coefficients output from said transposition conversion means, or the predetermined number m (0<m<n) of coefficients of the n coefficients output from said one-dimensional orthogonal transformation means;

second selection means for selecting either the n image data, or n data as a combination of the predetermined number m of coefficients selected by said first selection means and remaining (n−m) coefficients, which are not input to said first selection means, of the n coefficients output from said transposition conversion means, and supplying the selected data as n data to said one-dimensional orthogonal transformation means; and quantization means for quantizing a transform coefficient of a DC component and transform coefficients, quantization results of which assume values other than zero, of the n×n transform coefficients obtained by said one-dimensional orthogonal transformation means.

20. A program for making a computer function as an image processing apparatus of claim 19.

21. A storage medium storing a program of claim 20.

22. An image processing method for generating dequantized data by executing a dequantization process of quantized data, comprising:

a bit-shift step of bit-shifting a quantized data, the quantized data and a quantization threshold value being such that a maximum value of the dequantized data is a predetermined value, to generate data indicating a quantized value corresponding to an even number multiple of the quantized data, an addition step of generating data indicating a quantized value corresponding to an odd number multiple of the quantized data by adding the quantized data and the data indicating the quantized value corresponding to the even number multiple of the quantized data, which is generated in said bit-shift step;

a multiplication step of multiplying the quantized data and the quantization threshold value; and a selection step of selecting an operation result of one of said bit-shift step, said addition step, and said multiplication step, or the quantized data in accordance with the quantization threshold value, and outputting the selected data as the dequantized data.

23. An image processing method for receiving every n data of image data which has been segmented into rectangular blocks each consisting of n×n data, applying two-dimensional orthogonal transforms to the received data, and quantizing transform coefficients obtained by the two-dimensional orthogonal transformation, comprising:

a one-dimensional orthogonal transformation step of applying one-dimensional orthogonal transforms to the n inputs, and outputting n coefficients;

a transposition conversion step of transposing n×n coefficients output in said one-dimensional orthogonal transformation step, and outputting every n coefficients;

a first selection step of selecting either a predetermined number m (0<m<n) of coefficients of the n coefficients output in said transposition conversion step, or the predetermined number m (0<m<n) of coefficients of the n coefficients output in said one-dimensional orthogonal transformation step;

a second selection step of selecting either the n image data, or n data as a combination of the predetermined number m of coefficients selected in said first selection step and remaining (n−m) coefficients, which are not input in said first selection step, of the n coefficients output in said transposition conversion step, and supplying the selected data as n data to said one-dimensional orthogonal transformation step; and a quantization step of quantizing a transform coefficient of a DC component and transform coefficients, quantization results of which assume values other than zero, of the n×n transform coefficients obtained in said one-dimensional orthogonal transformation step.

* * * * *

UNITED STATES PATENT AND TRADEMARK OFFICE
CERTIFICATE OF CORRECTION

| | |
|---|---|
| PATENT NO. | : 7,127,119 B2 |
| APPLICATION NO. | : 10/263822 |
| DATED | : October 24, 2006 |
| INVENTOR(S) | : Susumu Igarashi |

It is certified that error appears in the above-identified patent and that said Letters Patent is hereby corrected as shown below:

ON THE TITLE PAGE - ITEM (56) REFERENCES CITED:

FOREIGN PATENT DOCUMENTS, "JP 02001078190 A * 3/2001" should read --JP 2001-078190 A * 3/2001--.

SHEET 9:

Figure 9, "DECORDER" should read --DECODER--.

SHEET 11:

Figure 11, "DECORDER" should read --DECODER--.

COLUMN 1:

Line 55, "out them," should read --them out,--.

COLUMN 2:

Line 50, "internal undergoes" should read --internal block memory undergoes--.

COLUMN 3:

Line 5, ""h7" input" should read --"h7" are input--;
Line 9, "is" should read --are--;
Line 12, ""v0" input" should read --"v0" are input--; and
Line 15, "is" should read --are--.

COLUMN 5:

Line 16, "instructs hold" should read --instructs to hold--.

COLUMN 13:

Line 43, "(not shown," should read --(not shown)--.

UNITED STATES PATENT AND TRADEMARK OFFICE
CERTIFICATE OF CORRECTION

PATENT NO. : 7,127,119 B2
APPLICATION NO. : 10/263822
DATED : October 24, 2006
INVENTOR(S) : Susumu Igarashi It is certified that error appears in the above-identified patent and that said Letters Patent is hereby corrected as shown below:

COLUMN 18:

Line 10, "blocks." should read --block.--;
Line 14, "blocks" should read --block--; and
Line 19, "blocks" should read --block--.

COLUMN 20:

Line 44, "interest" should read --interest.--.

COLUMN 23:

Line 12, "(1024/(5 to 16)," should read --(1024/(5 to 16)),--.

Signed and Sealed this

Seventh Day of October, 2008

JON W. DUDAS
*Director of the United States Patent and Trademark Office*